(12) United States Patent
Lee et al.

(10) Patent No.: US 11,758,138 B2
(45) Date of Patent: *Sep. 12, 2023

(54) IMAGE ENCODING METHOD AND APPARATUS, AND IMAGE DECODING METHOD AND APPARATUS

(71) Applicant: SAMSUNG ELECTRONICS CO., LTD., Suwon-si (KR)

(72) Inventors: Sun-il Lee, Seoul (KR); Jung-hye Min, Yongin-si (KR); Na-rae Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,685

(22) Filed: May 2, 2022

(65) Prior Publication Data
US 2022/0256152 A1 Aug. 11, 2022

Related U.S. Application Data

(63) Continuation of application No. 16/923,702, filed on Jul. 8, 2020, now Pat. No. 11,323,709, which is a
(Continued)

(51) Int. Cl.
*H04N 19/122* (2014.01)
*H04N 19/176* (2014.01)
(Continued)

(52) U.S. Cl.
CPC ......... *H04N 19/122* (2014.11); *H04N 19/136* (2014.11); *H04N 19/157* (2014.11); *H04N 19/159* (2014.11); *H04N 19/176* (2014.11)

(58) Field of Classification Search
USPC .................................................. 375/240.02
See application file for complete search history.

(56) References Cited

U.S. PATENT DOCUMENTS 9,723,313 B2 8/2017 Yang et al.
10,275,891 B2 4/2019 Jalali et al.
(Continued)

FOREIGN PATENT DOCUMENTS

| KR | 10-2012-0060914 | 6/2012 |
| KR | 10-2013-0119463 | 10/2013 |

(Continued)

OTHER PUBLICATIONS

International Search Report (PCT/ISA/210) dated May 15, 2017 issued by the International Searching Authority in International Application No. PCT/KR2017/001535.
(Continued)

*Primary Examiner* — Behrooz M Senfi
(74) *Attorney, Agent, or Firm* — Sughrue Mion, PLLC

(57) ABSTRACT

Provided is a method of decoding motion information characterized in that information for determining motion-related information includes spatial information and time information, wherein the spatial information indicates a direction of spatial prediction candidates used for sub-units from among spatial prediction candidates located on a left side and an upper side of a current prediction unit, and the time information indicates a reference prediction unit of a previous picture used for prediction of the current prediction unit. Further, an encoding apparatus or a decoding apparatus capable of performing the above described encoding or decoding method may be provided.

3 Claims, 22 Drawing Sheets

Related U.S. Application Data continuation of application No. 16/077,392, filed as application No. PCT/KR2017/001535 on Feb. 13, 2017, now Pat. No. 10,735,731.

(60) Provisional application No. 62/294,417, filed on Feb. 12, 2016.

(51) Int. Cl.
*H04N 19/136* (2014.01)
*H04N 19/159* (2014.01)
*H04N 19/157* (2014.01)

(56) References Cited

U.S. PATENT DOCUMENTS

| | | | |
|---|---|---|---|
| 10,735,731 B2* | 8/2020 | Lee | H04N 19/159 |
| 11,323,709 B2* | 5/2022 | Lee | H04N 19/157 |
| 2007/0071096 A1 | 3/2007 | Chen et al. | |
| 2012/0170649 A1 | 7/2012 | Chen et al. | |
| 2012/0201303 A1 | 8/2012 | Yang et al. | |
| 2013/0272381 A1 | 10/2013 | Guo et al. | |
| 2014/0064361 A1 | 3/2014 | Karczewicz et al. | |
| 2014/0177713 A1 | 6/2014 | Yuan et al. | |
| 2015/0139308 A1 | 5/2015 | Lee et al. | |
| 2018/0208466 A1 | 7/2018 | Noyes | |
| 2019/0052876 A1 | 2/2019 | Lee et al. | |
| 2020/0177921 A1 | 6/2020 | Koo | |
| 2021/0152827 A1* | 5/2021 | Park | H04N 19/82 |
| 2022/0256152 A1 | 8/2022 | Lee et al. | |

FOREIGN PATENT DOCUMENTS

| | | |
|---|---|---|
| KR | 10-2015-0003324 | 1/2015 |
| KR | 10-2015-0004484 | 1/2015 |
| KR | 10-2015-0052247 A | 5/2015 |
| KR | 10-2434480 B1 | 8/2022 |

OTHER PUBLICATIONS

Written Opinion (PCT/ISA/237) dated May 15, 2017 issued by the International Searching Authority in International Application No. PCT/KR2017/001535.

Communication dated Jan. 28, 2019, from the European Patent Office in counterpart European Application No. 17750483.4.

Communication dated Nov. 16, 2022 issued by the European Patent Office in application No. 22189447.0.

Notice of Allowance dated Jun. 2, 2023, issued by Korean Patent Office in Korean Patent Application No. 10-2022-7028299.

\* cited by examiner

FIG. 13

| BLOCK SHAPE DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 18

| SQUARE BLOCK | |
|---|---|
| (00)b | □ |
| (01)b | ⊞ |
| (10)b | ⊟ |
| (11)b | ⊡ |

| NON-SQUARE BLOCK | | |
|---|---|---|
| (0)b | ▭ | ▯ |
| (10)b | ⊟ | ⊡ |
| (11)b | ⊟⊟ | ⊡⊡ |

FIG. 19

| SQUARE BLOCK | |
|---|---|
| (00)b | □ |
| (10)b | ⊟ |
| (11)b | ⊡ |

| NON-SQUARE BLOCK | | |
|---|---|---|
| (0)b | ▭ | ▯ |
| (10)b | ⊟ | ⊡ |
| (11)b | ⊟⊟ | ⊡⊡ |

IMAGE ENCODING METHOD AND APPARATUS, AND IMAGE DECODING METHOD AND APPARATUS

CROSS-REFERENCE TO RELATED APPLICATIONS

This is a Continuation application of U.S. patent application Ser. No. 16/923,702, filed Jul. 8, 2020, which is a continuation application of U.S. patent application Ser. No. 16/077,392 filed on Aug. 10, 2018, which is a National Stage Entry of International Application No. PCT/KR2017/001535 filed Feb. 13, 2017, which claims benefit of Provisional Patent Application No. 62/294,417 filed Feb, 12, 2016, the disclosure of which is incorporated herein in its entirety by reference.

TECHNICAL FIELD

The present disclosure relates to methods and apparatuses for encoding or decoding an image by using various data units included in the image, and more particularly, to a method of adaptively selecting a transform kernel based on a transform shape (a transform size and a shape such as a square shape, a non-square shape, or an arbitrary shape) in a video compression codec.

BACKGROUND ART

A general video compression codec uses a method of compressing a video by applying a transform to a residual signal obtained via intra prediction or inter prediction and then performing quantization and entropy coding on a transform coefficient. A transform shape is a square shape, and a discrete cosine transform (DCT) kernel or a kernel in which a DCT is approximated to an integer transform is generally used as a transform kernel. For example, recently, a high efficiency video coding (HEVC) codec adopts a square integer transform having a size of 4×4, 8×8, 16×16, or 32×32, and the square integer transform is obtained by approximating a DCT. However, HEVC uses an integer transform obtained by approximating a discrete sine transform (DST) only for a residual signal having a size of 4×4 exclusively obtained via intra prediction.

Recently, the joint video experts team (JVET) and others have actively explored technology for next generation video codec standardization since HEVC, and new transform technologies have been introduced. For example, adaptive multiple transformation (AMT) is a method of selecting a kernel to be used for a current transform unit (TU) from among a plurality of pre-defined candidate transform kernels, applying the selected kernel to the current TU, and additionally transmitting information about the selected kernel. In this case, the set of candidate transform kernels are fixed in a coding unit (CU) to which inter prediction is applied, and vary according to an inter prediction mode in a CU to which intra prediction is applied. In addition, a number of secondary transform technologies of applying a transform again to a transform coefficient obtained after primary transformation have been proposed. For example, rotational transformation (ROT) involves splitting a transform coefficient into 4×4 units, selecting one from among pre-determined secondary transforms, and applying the selected secondary transform to the 4×4 units. In non-separable secondary transformation (NSST) that operates like ROT, a transform kernel is non-separable and secondary transform kernel candidates to be applied vary based on an intra prediction mode like in AMT.

DESCRIPTION OF EMBODIMENTS

Technical Problem

In conventional inter prediction technology, since one motion vector is assigned per block, prediction is performed, and a smaller block is compressed when there are various movements in blocks, more bits are required. Also, since one motion vector is used even when there are different objects in the same block, prediction accuracy is reduced.

Solution to Problem

Conventional technology has an advantage in that compression efficiency may be improved by adaptively selecting and using a transform kernel according to residual signal characteristics in a current transform unit (TU), but has a disadvantage in that since it is assumed that a square transform is used in all cases, the conventional technology is not applicable when a non-square or arbitrary transform is used.

There may be provided a video encoding method according to an embodiment including: generating a residual block including a residual signal for a current coding unit, based on a prediction signal generated by prediction with respect to the current coding unit; and performing transformation on the residual signal by applying a transform kernel having a predetermined size corresponding to a size of the residual block, wherein the performing of the transformation includes: obtaining transform shape information about the size or a shape of the residual block; and adaptively determining the transform kernel based on the transform shape information.

There may be provided a video decoding method according to an embodiment including: obtaining encoded data of a current coding unit from among coding units of an encoded current picture and transform shape information about a size or a shape of a residual block including a residual signal with respect to the current coding unit from a parsed bitstream; adaptively determining a transform kernel based on the transform shape information; generating a residual signal for the current coding unit by performing transformation on the current coding unit by using the determined transform kernel; and performing decoding based on the residual signal with respect to the current coding unit.

There may be provided a video decoding apparatus according to an embodiment including: a receiver configured to receive and parse a bitstream with respect with an encoded data; an extractor configured to extract the encoded data of a current coding unit from among coding units for encoding a current picture of encoded video and transform shape information about a size or a shape of a residual block including a residual signal with respect to the current coding unit from a parsed bitstream; a transform kernel selector configured to adaptively determine a transform kernel based on the transform shape information to decode the encoded data; a transformer configured to generate the residual signal for the current coding unit by performing transformation on the current coding unit by using the determined transform kernel; and a decoder configured to performing decoding based on the residual signal with respect to the current coding unit.

Advantageous Effects of Disclosure

According to various embodiments of the present disclosure, since a transform kernel is adaptively selected based on a transform shape (e.g., a square shape, a non-square shape, or an arbitrary shape), in addition to information that is typically used such as an intra prediction mode, compression efficiency may be improved.

BRIEF DESCRIPTION OF DRAWINGS

FIG. 13 illustrates a process of determining a depth of a coding unit according to a change in a shape and a size of the coding unit when a plurality of coding units are determined as the coding unit is recursively split, according to an embodiment.

FIG. 18 illustrates various shapes of a coding unit that may be determined based on split shape information that may be represented as a binary code, according to an embodiment.

FIG. 19 illustrates other shapes of a coding unit that may be determined based on split shape information that may be represented as a binary code, according to an embodiment.

BEST MODE

Figure 1:
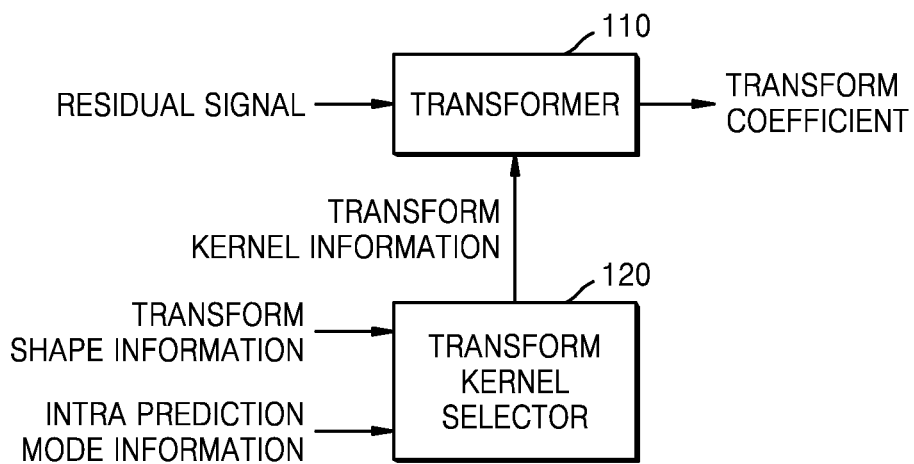
FIG. 1 is a block diagram of an encoding apparatus including a transform kernel selector that adaptively selects a transform kernel based on a transform shape and a transformer, according to an embodiment.

There may be provided a video encoding method according to an embodiment including: generating a residual block including a residual signal for a current coding unit, based on a prediction signal generated by prediction with respect to the current coding unit; and performing transformation on the residual signal by applying a transform kernel having a predetermined size corresponding to a size or a shape of the residual block, wherein the performing of the transformation includes: obtaining transform shape information about the size or a shape of the residual block; and adaptively determining the transform kernel based on the transform shape information.

According to an embodiment, the transform shape information may include information about a shape indicating whether the shape of the residual block is a square shape, a non-square shape, or an arbitrary shape.

According to an embodiment, there may be provided a video encoding method including: determining whether the transformation is performed by separating the residual signal in a vertical direction and a horizontal direction; and when the transformation is performed by separating the residual signal in the vertical direction and the horizontal direction, adaptively determining the transform kernel based on the transform shape information in each of the vertical direction and the horizontal direction.

According to an embodiment, there may be provided a video encoding method including: obtaining prediction information indicating whether the residual signal is obtained by intra prediction; when the residual signal is obtained by the intra prediction, obtaining information about an intra prediction mode used in the intra prediction; and when the residual signal is obtained by the intra prediction, determining the transform kernel based on the information about the intra prediction mode.

According to an embodiment, there may be provided a video encoding method including: obtaining transform kernel candidates based on the transform shape information; obtaining a transform kernel index indicating a transform kernel used in the transformation from among the transform kernel candidates; and determining the transform kernel used in the transformation from among the transform kernel candidates based on the transform kernel index.

There may be provided a video decoding method according to an embodiment including: obtaining encoded data of a current coding unit from among coding units for encoding a current picture of an encoded video and transform shape information about a size or a shape of a residual block including a residual signal with respect to the current coding unit, from a parsed bitstream; adaptively determining a transform kernel based on the transform shape information to decode the encoded data; generating the residual signal for the current coding unit by performing transformation on the current coding unit by using the determined transform kernel; and performing decoding based on the residual signal with respect to the current coding unit.

According to an embodiment, the transform shape information may include information about a shape indicating whether the shape of the residual block is a square shape, a non-square shape, or an arbitrary shape.

According to an embodiment, there may be provided a video decoding method including: determining whether the transformation is performed by separating the residual signal in a vertical direction and a horizontal direction; and when the transformation is performed by separating the residual signal in the vertical direction and the horizontal direction, adaptively determining the transform kernel based on the transform shape information in each of the vertical direction and the horizontal direction.

According to an embodiment, there may be provided a video decoding method including: obtaining prediction information indicating whether the residual signal is obtained by intra prediction from the bitstream; when the residual signal is obtained by the intra prediction, obtaining information about an intra prediction mode used in the intra prediction from the bitstream; and when the residual signal is obtained by the intra prediction, determining the transform kernel based on the information about the intra prediction mode.

According to an embodiment, there may be provided a video decoding method including: obtaining transform kernel candidates based on the transform shape information; obtaining a transform kernel index indicating a transform kernel used in the transformation from among the transform kernel candidates; and determining the transform kernel used in the transformation from among the transform kernel candidates based on the transform kernel index.

There may be provided a video decoding apparatus according to an embodiment including: a receiver configured to receive and parse a bitstream for an encoded video; an extractor configured to extract encoded data of a current coding unit from among coding units that are data units for encoding a current picture of the encoded video and transform shape information about a size or a shape of a residual block with respect to the current coding unit, from the parsed bitstream; a transform kernel selector configured to adaptively determine a transform kernel based on the transform shape information to decode the encoded data; a transformer configured to generate the residual signal for the current coding unit by performing transformation on the current coding unit by using the determined transform kernel; and a decoder configured to perform decoding based on the residual signal with respect to the current coding unit.

According to an embodiment, the transform shape information may include information about a shape indicating whether the shape of the residual block is a square shape, a non-square shape, or an arbitrary shape.

According to an embodiment, the transform kernel selector may be further configured to: determine whether the transformation is performed by separating the residual signal in a vertical direction and a horizontal direction; and when the transformation is performed by separating the residual signal in the vertical direction and the horizontal direction, adaptively determine the transform kernel based on the transform shape information in each of the vertical direction and the horizontal direction.

According to an embodiment, the transform kernel selector may be further configured to: obtain, from the bitstream, prediction information indicating whether the residual signal is obtained by intra prediction; when the residual signal is obtained by the intra prediction, obtain information about an intra prediction mode used in the intra prediction from the bitstream; and when the residual signal is obtained by the intra prediction, determine the transform kernel based on the information about the intra prediction mode.

According to an embodiment, the transform kernel selector may include: a transform kernel candidate deriver configured to obtain transform kernel candidates based on the transform shape information; and a transform kernel determiner configured to obtain a transform kernel index indicating a transform kernel used in the transformation from among the transform kernel candidates and generate transform kernel information used in the transformation from among the transform kernel candidates based on the transform kernel index.

There may be provided a video encoding apparatus according to an embodiment including: a transformer configured to generate a residual block including a residual signal for a current coding unit, based on a prediction signal generated by prediction for the current coding unit, and perform a transform on the residual signal by applying a transform kernel having a predetermined size corresponding to a size of the residual block; and a transform kernel selector configured to obtain transform shape information about the size or a shape of the residual block, and adaptively determine the transform kernel based on the transform shape information.

According to an embodiment, the transform shape information may include information about a shape indicating whether the shape of the residual block is a square shape, a non-square shape, or an arbitrary shape.

According to an embodiment, when it is determined whether the transformation is performed by separating the residual signal in a vertical direction and a horizontal direction and when the transformation is performed by separating the residual signal in the vertical direction and the horizontal direction, the transform kernel may be adaptively determined based on the transform shape information in each of the vertical direction and the horizontal direction.

According to an embodiment, there may be provided a video encoding apparatus characterized by: obtaining prediction information indicating whether the residual signal is obtained by intra prediction; when the residual signal is obtained by the intra prediction, obtaining information about an intra prediction mode used in the intra prediction; and when the residual signal is obtained by the intra prediction, determining the transform kernel based on the information about the intra prediction mode.

According to an embodiment, there may be provided a video encoding apparatus characterized by obtaining transform kernel candidates based on the transform shape information; obtaining a transform kernel index indicating a transform kernel used in the transformation from among the transform kernel candidates; and determine the transform kernel used in the transformation from among the transform kernel candidates based on the transform kernel index.

MODE OF DISCLOSURE

Advantages and features of the present disclosure and methods of accomplishing the same may be understood more readily by reference to the following detailed description of embodiments and the accompanying drawings. In this regard, the present embodiments may have different forms and should not be interpreted as being limited to the descriptions set forth herein. Rather, these embodiments are provided so that this disclosure will be thorough and complete and will fully convey the scope of the present disclosure to one of ordinary skill in the art.

Hereinafter, the terms used in the specification will be briefly defined, and the present disclosure will be described in detail.

The terms used in the present disclosure are those general terms currently widely used in the art in consideration of functions in the present disclosure, but the terms may vary according to the intention of one of ordinary skill in the art, precedents, or new technology in the art. Also, some of the terms used herein may be arbitrarily chosen by the present applicant. In this case, these terms are defined in detail below. Accordingly, the specific terms used herein should be understood based on the unique meanings thereof and the whole context of the present disclosure.

As used herein, the singular forms "a", "an", and "the" are intended to include the plural forms as well, unless the context clearly indicates otherwise Throughout the specification, when a portion "includes" an element, another element may be further included, rather than excluding the existence of the other element, unless otherwise described. Also, the term "unit" used herein means a software component or a hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a still image of a video, or a moving image, i.e., a video itself.

Hereinafter, a "sample" denotes data that is assigned to a sampling location of an image and is to be processed. For example, pixels in an image of a spatial domain or transform coefficients in a transform domain may be samples. A unit including one or more samples may be defined as a block.

Hereinafter, embodiments of the present disclosure will be described in detail with reference to the attached drawings in order to enable one of ordinary skill in the art to embody and practice the present disclosure. Parts in the drawings unrelated to the detailed description are omitted to ensure clarity of the present disclosure.

FIG. 1 is a block diagram of an encoding apparatus including a transform kernel selector 120 that adaptively selects a transform kernel based on a transform shape, and a transformer 110, according to an embodiment.

Referring to FIG. 1, when a residual signal is applied to the transformer 110, the transformer 110 may perform transformation. Also, the transform kernel selector 120 may determine transform kernel information about a transform kernel to be applied to the residual signal and may transmit the transform kernel information as an input to the transformer 110.

According to an embodiment, the transform kernel selector 120 may receive transform shape information as a basic input. For example, the transform shape information may include information about a size and a shape of a current transform. In more detail, the transform shape information about the shape may include information about whether a transform shape is a square shape, a non-square shape, or an arbitrary shape. Also, when the transform shape is a non-square shape or an arbitrary shape, the transform shape information about the shape may include information about a detailed shape (e.g., a horizontal or vertical length). The transform shape information about the size may include information about vertical and horizontal lengths of a square transform, a non-square transform, or an arbitrary transform. Also, when the transform shape is an arbitrary shape, the transform shape information about the size may further include information about a diagonal length.

According to an embodiment, the transform kernel selector 120 may receive, as an input, information indicating whether the residual signal applied as a current input is a signal obtained by performing intra prediction. For example, the transform kernel selector 120 may receive, as an input, prediction information indicating whether the residual signal applied as the current input is a signal obtained by performing intra prediction. The prediction information may indicate whether the residual signal applied as the current input is a signal obtained by performing intra prediction or a signal obtained by performing inter prediction.

According to an embodiment, when the input residual signal is obtained by intra prediction, the transform kernel selector 120 may obtain information (i.e., intra prediction mode information) about an intra prediction mode used in the intra prediction. For example, the intra prediction mode may indicate an index in an Intra DC mode, an Intra Planar mode, and an Intra Angular mode. When the input residual signal is obtained by inter prediction, the transform kernel selector 120 may not receive the intra prediction mode information as an input.

Examples of the intra prediction mode for a luminance component may include the Intra Planar mode, the Intra DC mode, and the Intra Angular mode. In more detail, in the Intra Planar mode, a prediction value may be generated by averaging values obtained by performing linear interpolation (interpolation using a weight according to a distance) in horizontal and vertical directions on values obtained by copying reference pixels. Also, in the Intra_DC mode, an average value of neighboring pixels of a current block may be used as a prediction value. Prediction in the Intra DC mode may be performed by filtering samples located at a boundary of a prediction block in order to remove discontinuity between a prediction sample and reference samples, without using an average value for a block to be predicted as the prediction sample. Also, in the Intra Angular mode, a prediction sample may be obtained in consideration of directionality when the prediction sample is calculated from reference samples. Directionality according to each mode in the Intra Angular mode will be described below with reference to FIG. 6.

Also, examples of the intra prediction mode for a chrominance component may include the Intra DC mode, an Intra Vertical mode, an Intra-Horizontal mode, and an Intra_DM mode. The modes other than the Intra_DM mode may generate a prediction sample by using the same process as the method described for the luminance component. In the Intra_DM mode, a mode of a chrominance component may be used as the same mode as that of a luminance component by using the feature that the luminance component and the chrominance component are similar to each other.

According to an embodiment, the transformer 110 may apply a transform to the residual signal based on the transform kernel information determined and transmitted as an input by the transform kernel selector 120, and then may output a transform coefficient as a result of the transformation.

For example, the transform kernel selector 120 may adaptively select a transform kernel based on at least one of the transform shape information and the intra prediction mode information. For example, the transform kernel selector 120 may send the transform kernel information about the adaptively selected transform kernel to the transformer 110. In this case, the transformer 110 may perform transformation on the residual signal by applying the selected transform kernel based on the received transform kernel information. A kernel that is a discrete cosine transform (DCT) or approximates a DCT to an integer transform may be used as the transform kernel, and when the residual signal is a signal having a size of 4×4 obtained by intra prediction, a kernel obtained by approximating a discrete sine transform (DST) may be used. For example, types of the transform kernel may include transform kernels obtained by integerizing DCT-5, DCT-8, DST-1, and DST-7 transforms. Also, when the residual signal is a signal to which intra prediction is applied, types of the transform kernel may include a transform kernel obtained by offline training for each intra prediction mode and transform shapes. Also, when the residual signal is a signal to which inter prediction is applied, types of the transform kernel may include a transform kernel obtained by offline training according to each transform shape besides DCT and DST transforms. The types of the transform kernel are merely examples, and the present disclosure is not limited thereto.

For example, the transform kernel selector 120 may select a kernel to be used for a current transform unit (TU) from among a plurality of pre-defined candidate transform kernels, may apply the selected kernel, and may additionally transmit information about the selected kernel. In this case, the set of candidate kernels may be fixed in a coding unit to which inter prediction is applied, and may vary according to a prediction mode in a coding unit to which intra prediction is applied. Also, for example, the transformer 110 may perform secondary transformation where a transform is applied again to a transform coefficient obtained after primary transformation. In more detail, rotational transformation (ROT) may involve splitting a transform coefficient into 4×4 units, selecting one from among pre-determined secondary transformations, and applying the selected secondary transform. Also, in non-separable secondary transformation (NS_ST) that operates like the ROT, a transform kernel may be non-separable and secondary transform kernel candidates to be applied may vary based on an intra prediction mode.

Figures 3, 4:
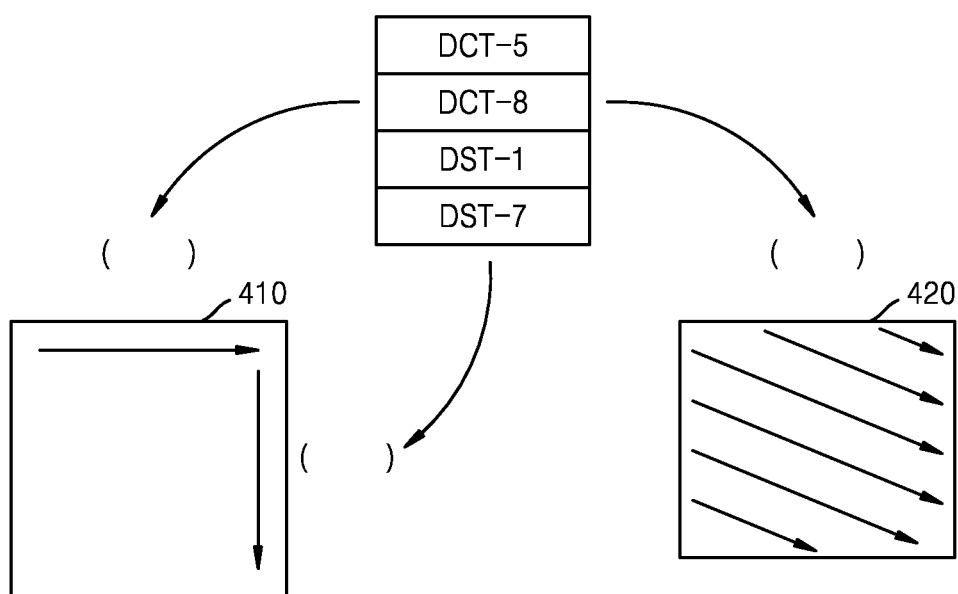
FIG. 3 illustrates a transform shape applicable during a transform, according to an embodiment.
FIG. 4 illustrates that a transform kernel is assigned according to whether separation is vertical separation or horizontal separation, according to an embodiment.

FIG. 3 illustrates a transform shape applicable during transformation according to an embodiment.

According to an embodiment, an image decoding apparatus may split a coding unit into various shapes by using block shape information and split shape information obtained by a bistream obtainer. Shapes into which the coding unit may be split may correspond to various shapes including shapes described with reference to the above embodiments.

According to an embodiment, a shape of a residual block may be a square shape obtained by splitting a coding unit having a square shape in at least one of a horizontal direction and a vertical direction, or may be a non-square shape obtained by splitting a coding unit having a non-square shape into the horizontal direction or the vertical direction.

According to an embodiment, transform shape information may be represented as a two-digit binary code, and a binary code may be assigned to each transform shape. For example, when a coding unit is not split, the transform shape information may be represented as (00)b; when a coding unit is split in the horizontal direction and the vertical direction, the transform shape information may be represented as (01)b; when a coding unit is split in the horizontal direction, the transform shape information may be represented as (10)b; and when a coding unit is split in the vertical direction, the transform shape information may be represented as (11)b.

Also, for example, a coding unit may be split into two coding units, and in this case, the transform shape information may be represented as (10)b. Also, a coding unit may be split into three coding units, and in this case, the transform shape information may be represented as (11)b. Also, it may be determined that a coding unit is not split, and in this case, the transform shape information may be represented as (0)b. In order to use a binary code indicating the transform shape information, variable length coding (VLC), instead of fixed length coding (FLC), may be used.

FIG. 4 illustrates that a transform kernel is assigned according to whether separation is vertical separation or horizontal separation according to an embodiment.

According to an embodiment, the transform kernel selector 120 may determine a shape of a residual block (i.e., a transform is a square transform or a non-square transform), and may determine whether the transformation may be performed by separating a residual signal in a vertical direction and a horizontal direction. For example, the transform kernel selector 120 may include the feature that the residual signal is separable in transform kernel information and may send the transform kernel information to a transformer.

According to an embodiment, when the feature that the residual signal is separable is included, the transform kernel selector 120 may determine to select each transform kernel based on transform shape information of the residual signal in each of the vertical direction and the horizontal direction.

For example, when transform kernel information about a residual block 410 includes the feature that a transform is a square transform or a non-square transform and is separable, the transform kernel information may include information about a transform kernel to be applied in each of the vertical and horizontal directions. In contrast, when a transform is a square transform or a non-square transform and is non-separable or when a transform is an arbitrary transform, like in a residual block 420, the transform kernel information may include information about one transform kernel irrespective of an application direction.

Figure 5:
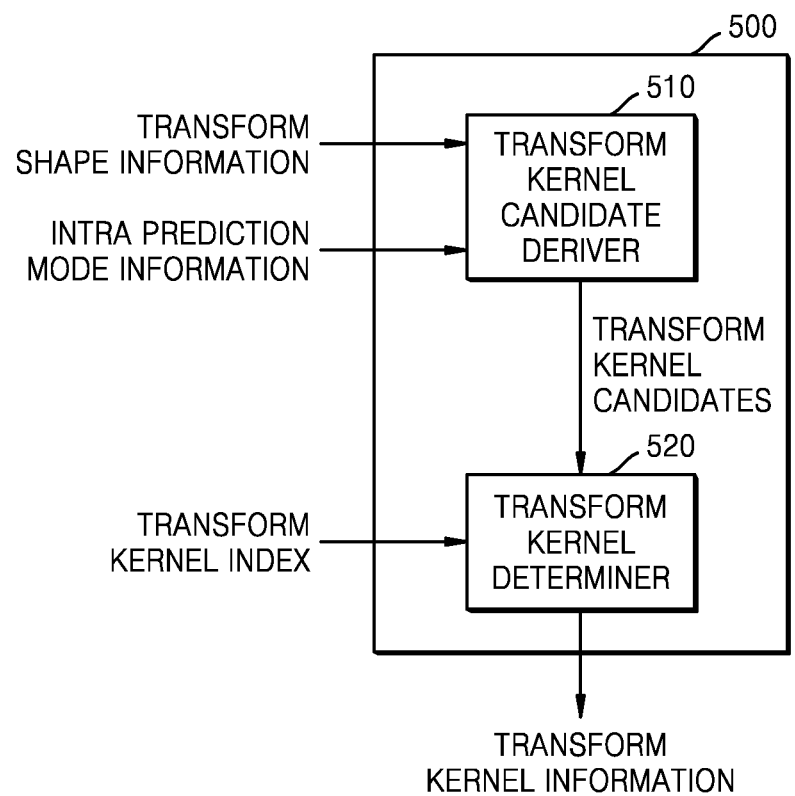
FIG. 5 is a block diagram of a transform kernel selector including a transform kernel candidate deriver and a transform kernel determiner, according to an embodiment.

FIG. 5 is a block diagram of a transform kernel selector including a transform kernel candidate deriver 510 and a transform kernel determiner 520 according to an embodiment.

According to an embodiment, the transform kernel selector may include the transform kernel candidate deriver 510 and the transform kernel determiner 520. The transform kernel candidate deriver 510 may receive, as an input, transform shape information and intra prediction mode information, and may derive transform kernel candidates to be applied to a current residual signal. The intra prediction mode information may be sent to the transform kernel candidate deriver 510 only when the current residual signal is obtained by intra prediction.

According to an embodiment, the transform kernel candidates may include one or more sets of transform kernel candidates. For example, transform kernels obtained by integerizing DCT-5, DCT-8, DST-1, and DST-7 transforms may be included in the transform kernel candidates. Also, when the residual signal is a residual signal to which intra prediction is applied, a transform kernel obtained by offline training for each intra prediction mode and transform shapes may be included in the transform kernel candidates. Also, when the residual signal is a residual signal to which inter prediction is applied, a transform kernel obtained by offline training according to each transform shape besides DCT and DST transforms may be included in the transform kernel candidates. The transform kernel candidates may be merely examples, and the present disclosure is not limited thereto.

The transform kernel determiner 520 may receive, as an input, the transform kernel candidates from the transform kernel candidate deriver 510, may receive, as an input, a transform kernel index from a bitstream, may determine a transform kernel to be applied to the current residual signal, and may send transform kernel information to a transformer.

According to an embodiment, the transform kernel index may include index information about a kernel to be applied to the current residual signal from among the plurality of transform kernel candidates. For example, the transform kernel index may be applied, as an input, only when the transform kernel candidates include a plurality of sets of transform kernel candidates, and the transform kernel index may be included in the bitstream as described above. For example, when the number of the transform kernel candidates output by the transform kernel candidate deriver 510 is 1, the transform kernel determiner 520 may determine the single input as a transform kernel, and may send transform kernel information to the transformer. For example, when a transform is a square transform or a non-square transform and is separable, a process of deriving transform kernel candidates and determining a transform kernel may be performed in each of a vertical direction and a horizontal direction, and transform kernel information about vertical and horizontal transforms may be output.

Figure 6:
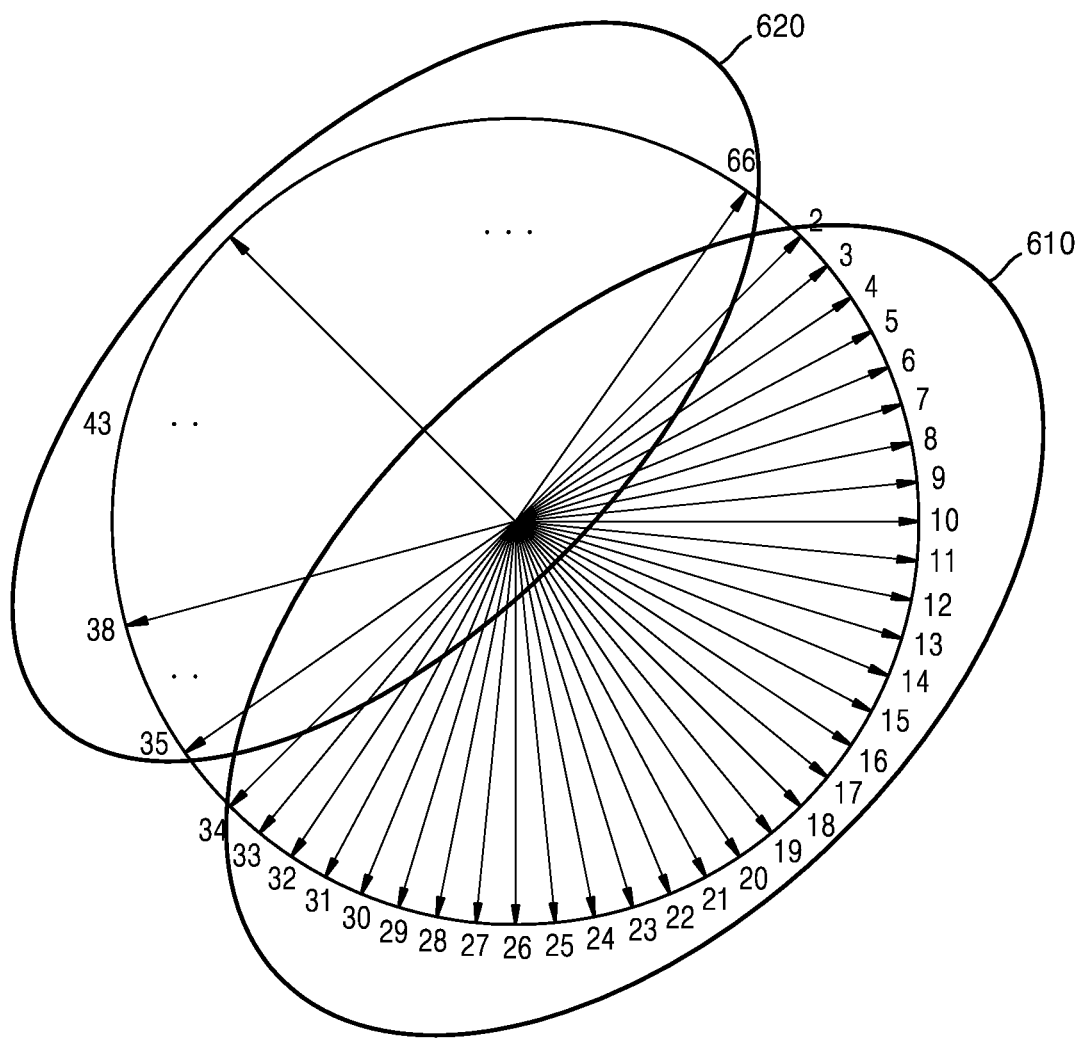
FIG. 6 illustrates information about an intra prediction mode according to an embodiment.
Figure 6:
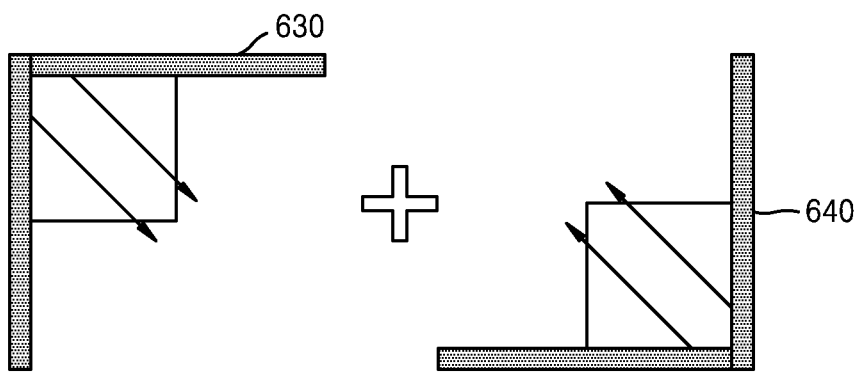

FIG. 6 illustrates information about an Intra-Angular mode from among intra prediction modes according to an embodiment.

According to an embodiment, new 67 prediction modes obtained by adding 32 prediction modes 620 to existing 35 prediction modes 610 may be included in the Intra-Angular mode from among the intra prediction modes.

For example, when intra prediction is performed by using both left and top data units 630 or right and bottom data units 640 according to the intra prediction mode, a transform kernel selector may obtain intra prediction mode information used in each intra prediction, and may select a transform kernel based on each obtained intra prediction mode information.

According to an embodiment, the intra prediction mode may indicate an index in an Intra DC mode, an Intra Planar mode, and an Intra Angular mode.

Figure 7A:
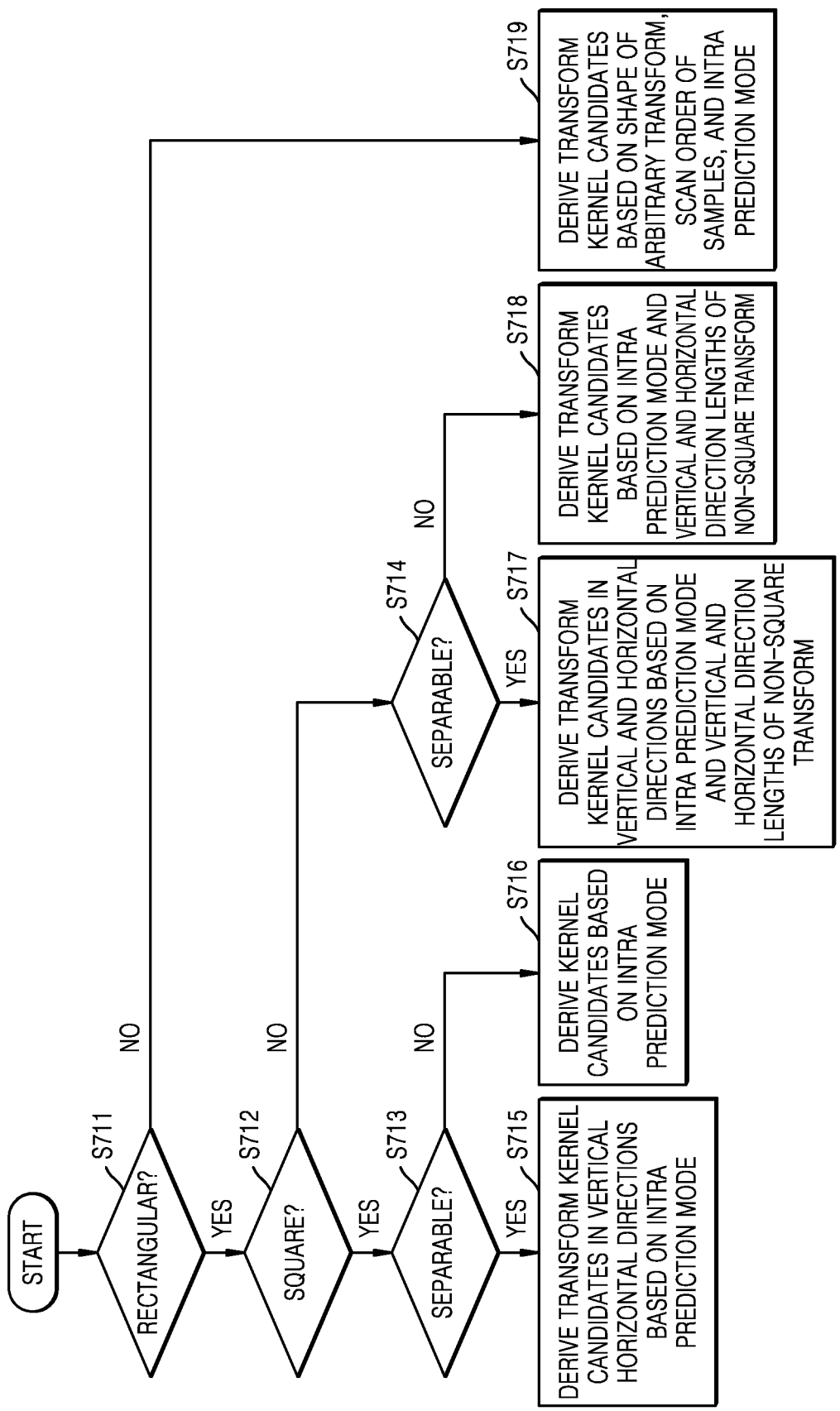
FIG. 7A is a flowchart of a process of deriving transform kernel candidates when prediction is intra prediction, according to an embodiment.
Figure 7B:
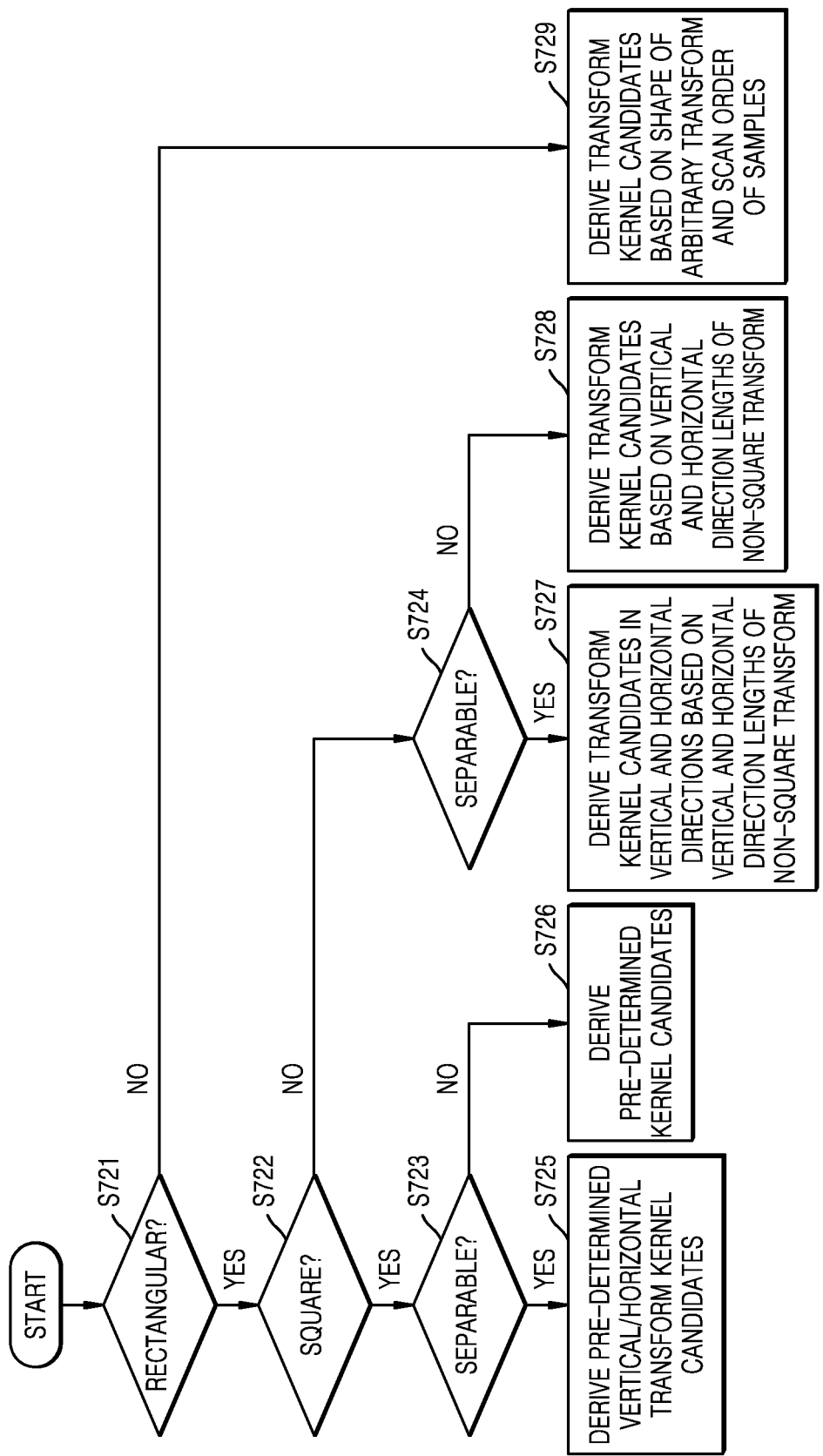
FIG. 7B is a flowchart of a process of deriving transform kernel candidates when prediction is not intra prediction, according to an embodiment.

FIGS. 7A and 7B are flowcharts of a process of deriving transform kernel candidates according to an embodiment.

FIG. 7A is a flowchart of a process of deriving transform kernel candidates when a current residual signal is a signal obtained by intra prediction.

According to an embodiment, it may be determined whether a shape of a current residual block is a rectangular shape (e.g., a square shape or a non-square shape) or an arbitrary shape based on transform shape information that is received as an input.

In more detail, in operation S711, it may be determined whether a shape of a current residual block is a rectangular shape based on transform shape information received as an input, and when the shape is a rectangular shape, in operation S712, it may be determined whether the shape is a square shape or a non-square shape. In contrast, when it is determined in operation S711 based on the transform shape information received as an input that the shape of the current residual block is not a rectangular shape, it may be determined that the shape of the current residual block is an arbitrary shape.

According to an embodiment, when it is determined based on the transform shape information that the shape of the current residual block is a rectangular shape (i.e., a square shape or a non-square shape), it may be determined whether a transform is separable or non-separable in each of a vertical direction and a horizontal direction.

In more detail, when the shape of the current residual block is a square shape, in operation S713, it may be determined whether the transform is separable. When the shape of the current residual block is a non-square shape, in operation S714, it may be determined whether the transform is separable. For example, when the transform is separable in each of the vertical direction and the horizontal direction, transform kernel candidates in each of the vertical direction and the horizontal direction may be derived.

According to an embodiment, when the transform shape information and whether the transform is separable are determined, the transform kernel candidates may be determined based on the transform shape information and whether the transform is separable.

In more detail, when the shape of the current residual block is a square shape and the transform is separable, in operation S715, a transform kernel selector may obtain the transform kernel candidates in each of the vertical direction and the horizontal direction based on an intra prediction mode. When the shape of the current residual block is a square shape and the transform is non-separable, in operation S716, the transform kernel selector may obtain the transform kernel candidates based on the intra prediction mode. When the shape of the current residual block is a non-square shape and the transform is separable, in operation S717, the transform kernel selector may obtain the transform kernel candidates in each of the vertical direction and the horizontal direction based on the intra prediction mode and vertical and horizontal lengths of a non-square transform. When the shape of the current residual block is a non-square shape and the transform is non-separable, in operation S718, the transform kernel selector may obtain the transform kernel candidates based on the intra prediction mode and the vertical and horizontal lengths of the non-square transform. When the shape of the current residual block is an arbitrary shape, in operation S719, the transform kernel selector may obtain the transform kernel candidates based on a shape of an arbitrary residual block, a scan order of residual signal samples performed in a pre-step of the transformation, and the intra prediction mode.

FIG. 7B is a flowchart of a process of deriving transform kernel candidates when a current residual signal is a signal obtained by inter prediction.

According to an embodiment, it may be determined whether a shape of a current residual block is a rectangular shape (e.g., a square shape or a non-square shape) or an arbitrary shape based on transform shape information that is received as an input.

In more detail, when it is determined in operation S721 that a shape of a current residual block is a rectangular shape based on transform shape information received as an input, and when the shape is a rectangular shape, in operation S722, it may be determined whether the shape is a square shape or a non-square shape. In contrast, when it is determined in operation S721 based on the transform shape information received as an input that the shape of the current residual block is not a rectangular shape, it may be determined that the shape of the current residual block is an arbitrary shape.

According to an embodiment, when it is determined based on the transform shape information that the shape of the current residual block is a rectangular shape (i.e., a square shape or a non-square shape), it may be determined whether a transform is separable or non-separable in each of a vertical direction and a horizontal direction.

In more detail, when the shape of the current residual block is a square shape, in operation S723, it may be determined whether the transform is separable. When the shape of the current residual block is a non-square shape, in operation S724, it may be determined whether the transform is separable. For example, when the transform is separable in each of the vertical direction and the horizontal direction, transform kernel candidates in each of the vertical direction and the horizontal direction may be derived.

According to an embodiment, when the transform shape information and whether the transform is separable are determined, the transform kernel candidates may be determined based on the transform shape information and whether the transform is separable.

In more detail, when the shape of the current residual block is a square shape and the transform is separable, in operation S725, the transform kernel selector may obtain the transform kernel candidates that are pre-determined in each of the vertical direction and the horizontal direction. When the shape of the current residual block is a square shape and the transform is non-separable, in operation S726, the transform kernel selector may obtain the pre-determined transform kernel candidates. When the shape of the current residual block is a non-square shape and the transform is separable, in operation S727, the transform kernel selector may obtain the transform kernel candidates in each of the vertical direction and the horizontal direction based on vertical and horizontal lengths of a non-square transform. When the shape of the current residual block is a non-square shape and the transform is non-separable, in operation S728, the transform kernel selector may obtain the transform kernel candidates based on the vertical and horizontal lengths of the non-square transform. When the shape of the current residual block is an arbitrary shape, in operation S729, the transform kernel selector may obtain the transform kernel candidates based on a shape of an arbitrary residual block and a scan order of residual samples performed in a pre-step of the transformation.

Figure 8:
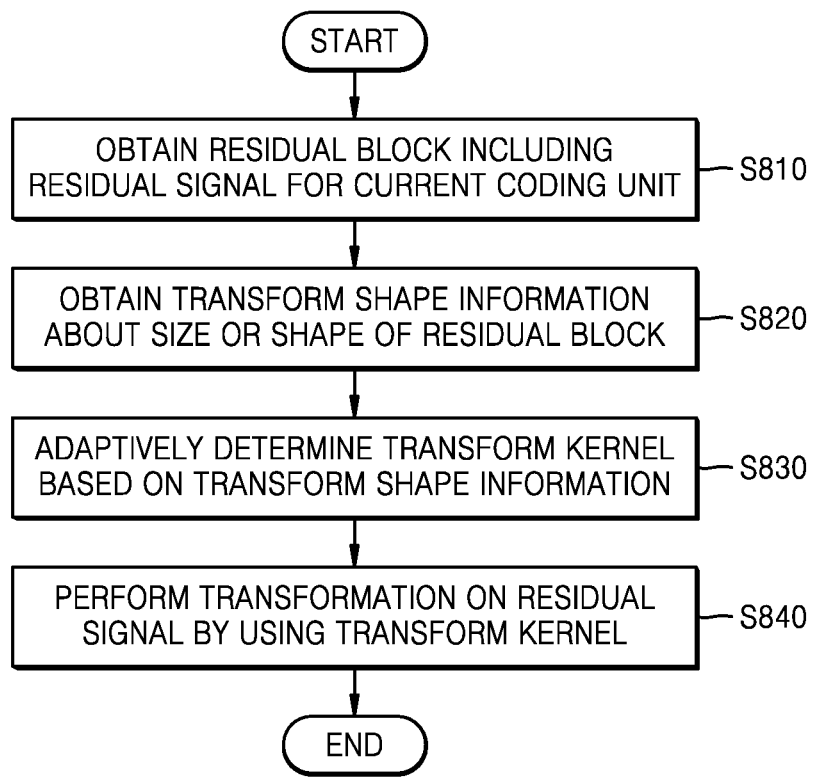
FIG. 8 is a flowchart of a method of performing transformation by adaptively selecting a transform kernel selector at an encoding end, according to an embodiment.

FIG. 8 is a flowchart of a method of performing transformation by adaptively selecting a transform kernel selector at an encoding end, according to an embodiment.

In operation S810, the transformer 110 may obtain a residual block including a residual signal for a current coding unit.

According to an embodiment, the residual block may be generated to have the same size and the same shape as those of the current coding unit by subtracting a prediction block generated by inter prediction or intra prediction from a coding unit to be currently encoded.

In operation S820, the transform kernel selector 120 may obtain transform shape information about a size or a shape of the residual block.

According to an embodiment, the transform shape information may include information about a size and a shape of a current transform. In more detail, the transform shape information about the shape may include information about whether a transform shape is a square shape, a non-square shape, or an arbitrary shape. Also, when the transform shape is a non-square shape or an arbitrary shape, the transform shape information about the shape may include information about a detailed shape (e.g., a horizontal or vertical length).

According to an embodiment, the transform kernel selector 120 may obtain information (i.e., intra prediction mode information) about an intra prediction mode used in intra prediction. However, when the input residual signal is obtained by inter prediction, the transform kernel selector 120 may not receive, as an input, the intra prediction mode information. Examples of the intra prediction mode may include an Intra Planar mode, an Intra DC mode, and an Intra Angular mode. New 67 prediction modes obtained by adding 32 prediction modes to existing 35 prediction modes may be included in the Intra-Angular mode.

According to an embodiment, the transform kernel selector 120 may include the feature that the residual signal is separable in a horizontal direction and a vertical direction in transform kernel information and may send the transform kernel information to the transformer 110.

For example, when the feature that the residual signal is separable is included, the transform kernel selector 120 may determine to select each transform kernel based on the transform shape information in each of the vertical direction and the horizontal direction of the residual signal. In contrast, when the feature that the residual signal is non-separable is included, the transform kernel information may include information about one transform kernel irrespective of an application direction.

In operation S830, the transform kernel selector 120 may adaptively determine a transform kernel based on the transform shape information.

According to an embodiment, a transform kernel candidate deriver of the transform kernel selector 120 may receive, as an input, the intra prediction mode information and the transform shape information, and may derive transform kernel candidates to be applied to a current residual signal. Also, a transform kernel determiner of the transform kernel selector 120 may receive, as an input, the transform kernel candidates from the transform kernel candidate deriver, may receive, as an input, a transform kernel index from a bitstream, may determine a transform kernel to be applied to the current residual signal, and may send transform kernel information to the transformer 110.

When the number of the transform kernel candidates output by the transform kernel candidate deriver is 1, the transform kernel determiner may determine the single input as a transform kernel, and may send the transform kernel information to the transformer 110. Alternatively, when a transform is a square transform or a non-square transform and is separable, a process of deriving transform kernel candidates and determining a transform kernel may be performed in each of the vertical and horizontal directions, and transform kernel information about vertical and horizontal transforms may be output.

In operation S840, the transformer 110 may perform transformation on the residual signal by using the determined transform kernel.

For example, the residual block having the same size and shape as those of a coding unit may be split into transform units and encoding may be performed in the transform units.

Figure 10:
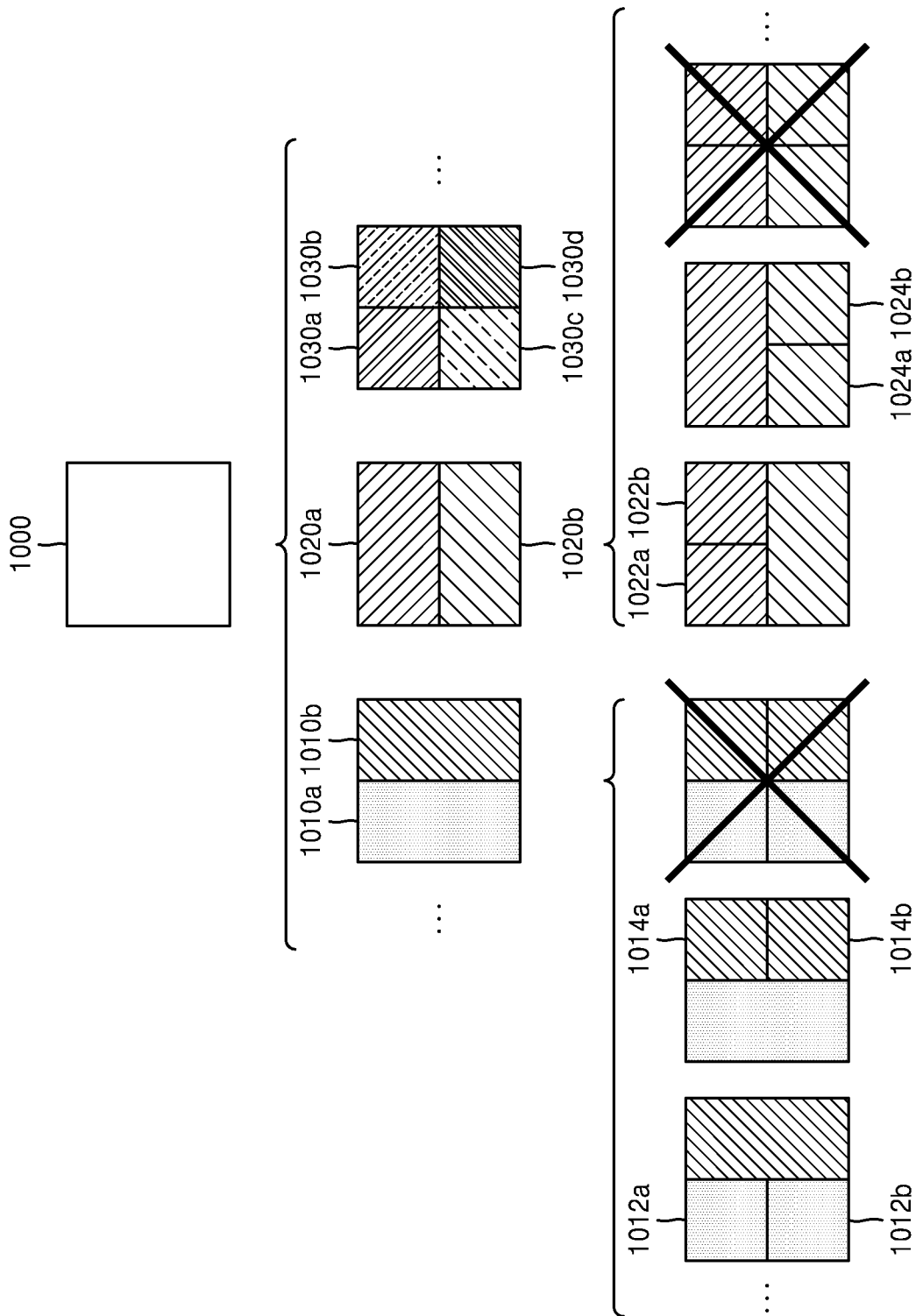
FIG. 10 illustrates that shapes into which second coding units may be split are restricted when the second coding units having a non-square shape split and determined from a first coding unit satisfy a predetermined condition, according to an embodiment.

FIG. 10 illustrates that shapes into which second coding units may be split by an image encoding apparatus are restricted when the second coding units having a non-square shape split and determined from a first coding unit 1000 satisfy a predetermined condition according to an embodiment.

According to an embodiment, an encoder may determine that the first coding unit 1000 having a square shape is split into second coding units 1010a, 1010b, 1020a, and 1020b having a non-square shape. Accordingly, the second coding units 1010a, 1010b, 1020a, and 1020b may be independently split. Accordingly, the encoder may determine that each of the second coding units 1010a, 1010b, 1020a, and 1020b is split or not split into a plurality of coding units. An operation of the image encoding apparatus of FIG. 10 to restrict splittable shapes when second coding units having a non-square shape satisfy a predetermined condition may be opposite to an operation of an image decoding apparatus to be described below with reference to FIG. 10, and thus a detailed explanation thereof will not be given.

Figure 11:
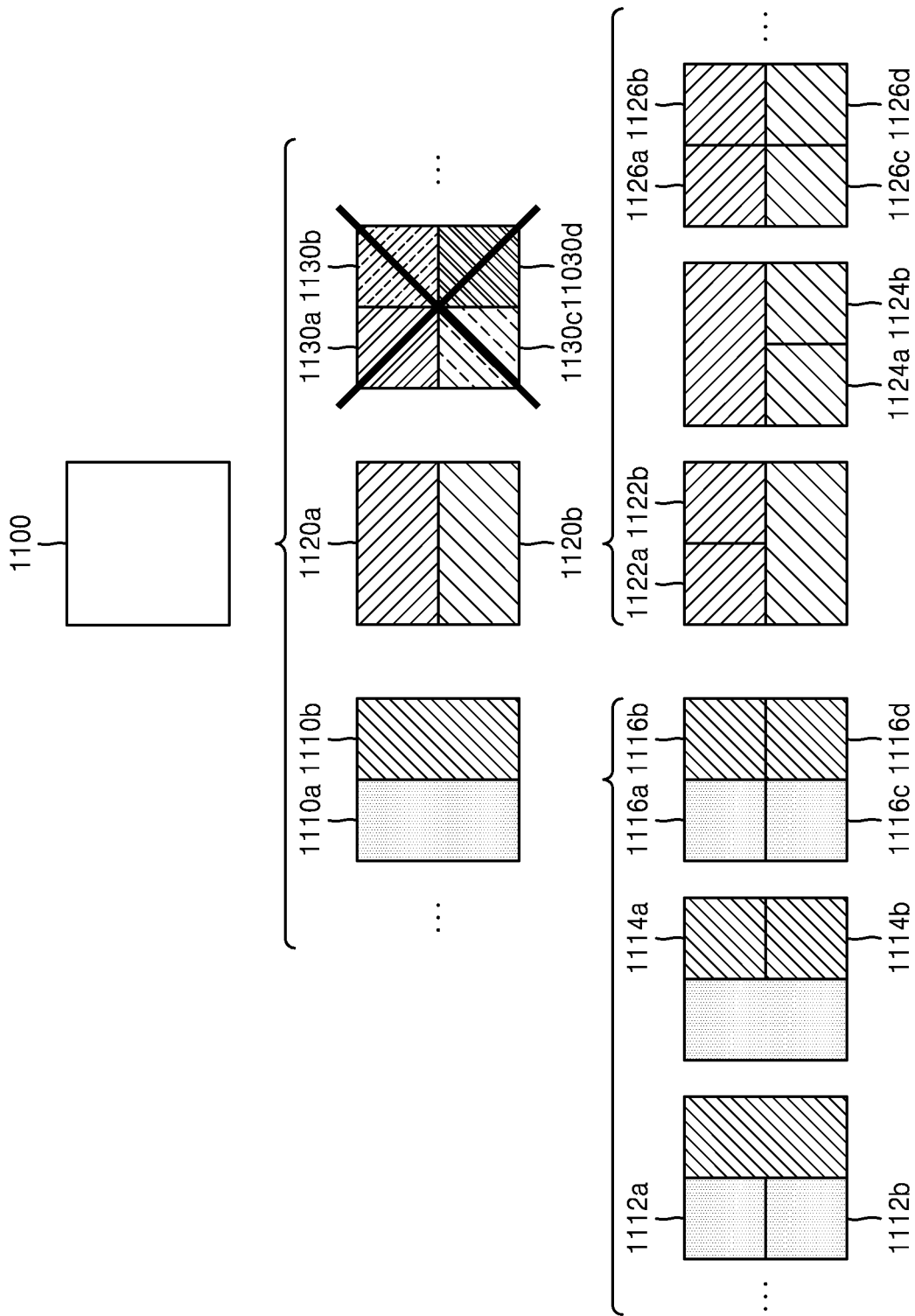
FIG. 11 illustrates a process of splitting a coding unit having a square shape when split shape information is unable to indicate that a coding unit is split into four square shapes, according to an embodiment.

FIG. 11 illustrates a process by which an image encoding apparatus splits a coding unit having a square shape when slit shape information is unable to indicate that a coding unit is split into four square coding units. An operation of the image encoding apparatus in this case may be opposite to an operation of an image decoding apparatus to be described below with reference to FIG. 11, and thus a detailed explanation thereof will not be given.

Figure 12:
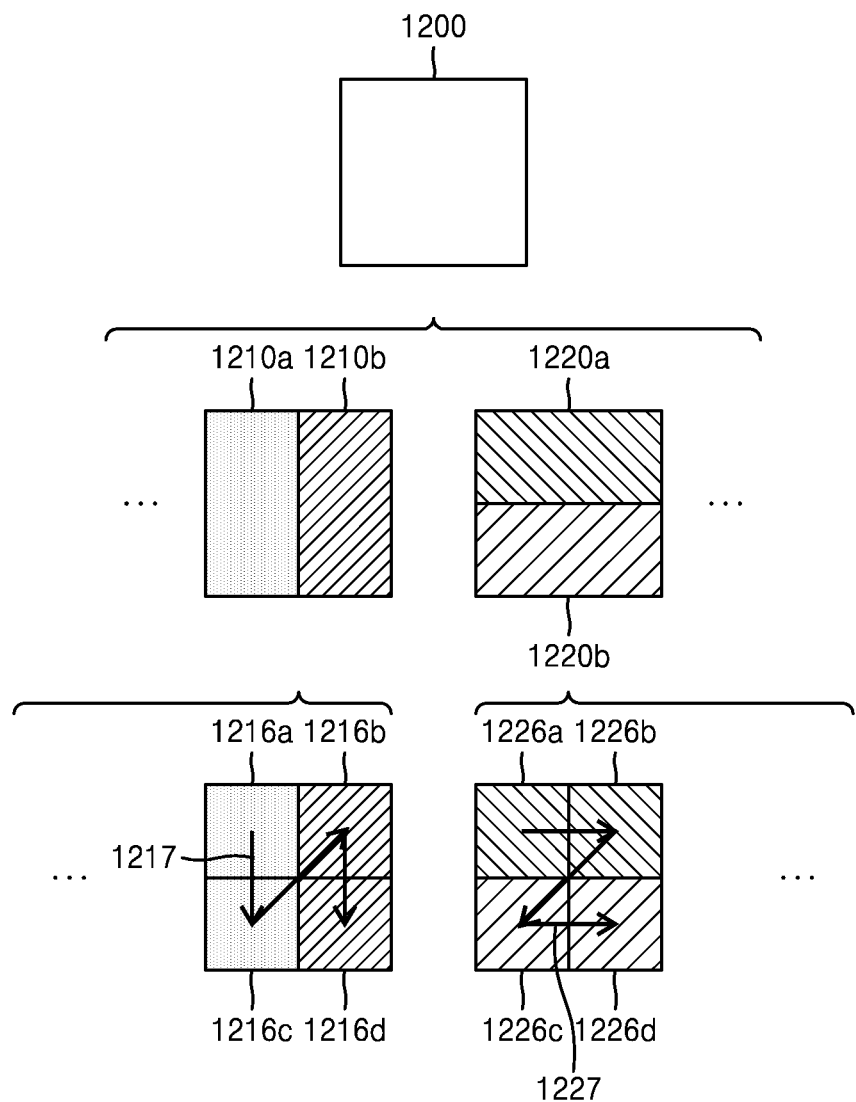
FIG. 12 illustrates that an order of processing a plurality of coding units may vary according to a process of splitting a coding unit, according to an embodiment.

FIG. 12 illustrates that an order of processing a plurality of coding units may vary according to a process of splitting a coding unit according to an embodiment.

According to an embodiment, an encoder may split a first coding unit 1200 having a square shape in at least one of a horizontal direction and a vertical direction. According to an embodiment, a bitstream generator may generate a bitstream including block shape information indicating that the first coding unit 120 has a square shape and split shape information indicating that the first coding unit 1200 is split in at least one of the horizontal direction and the vertical direction.

According to an embodiment, the encoder may determine second coding units (e.g., 1210a, 1210b, 1220a, 1220b, 1230a, 1230b, 1230c, and 1230d) by splitting the first coding unit 1200. Referring to FIG. 12, the second coding units 1210a, 1210b, 1220a, and 1220b having a non-square shape determined by splitting the first coding unit 1200 in the horizontal direction or the vertical direction may be independently split. For example, the encoder may determine third coding units 1216a through 1216d by respectively splitting, in the horizontal direction, the second coding units 1210a and 1210b generated as the first coding unit 1200 is split in the vertical direction, and may determine third coding units 1226a through 1226d by respectively splitting, in the horizontal direction, the second coding units 1220a and 1220b generated as the first coding unit 1200 is split in the horizontal direction. An operation of an image encoding apparatus related to FIG. 10 may be opposite to an operation of an image decoding apparatus to be described below with reference to FIG. 10, and thus a detailed explanation thereof will not be given.

FIG. 13 illustrates a process of determining a depth of a coding unit according to a change in a shape and a size of the coding unit when a plurality of coding units are determined as the coding unit is recursively split according to an embodiment. A process by which an encoder of an image encoding apparatus determines a depth of a coding unit may be opposite to a process by which a decoder of an image decoding apparatus determines a depth of a coding unit to be described below with reference to FIG. 13, and thus a detailed explanation thereof will not be given.

Figure 14:
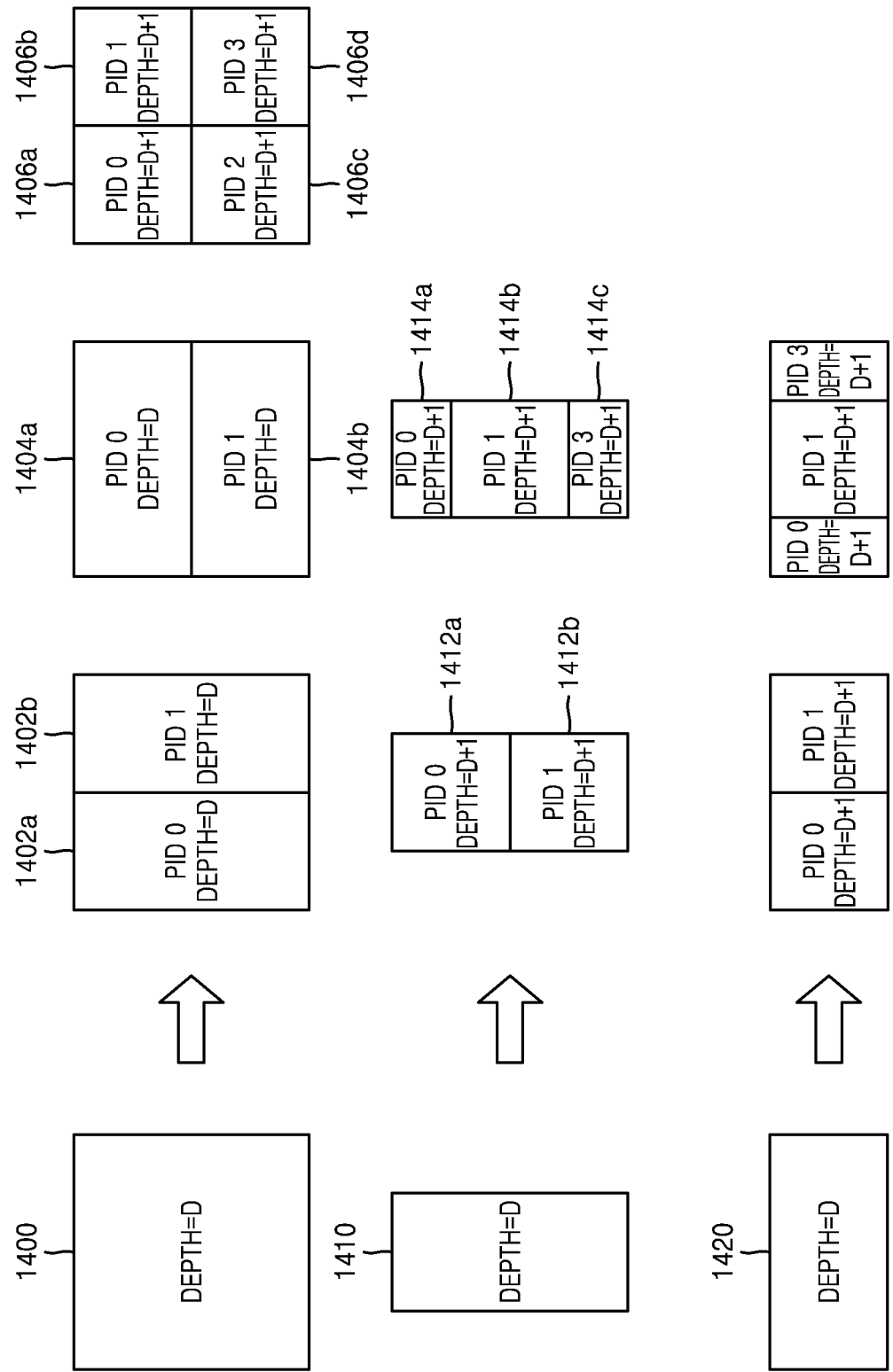
FIG. 14 illustrates a part index (PID) for distinguishing depths and coding units that may be determined according to shapes and sizes of coding units, according to an embodiment.

According to an embodiment, the image encoding apparatus may determine whether a coding unit is split into a specific split shape based on a value of an index for distinguishing a plurality of coding units split and determined from a current coding unit. Referring to FIG. 14, the image encoding apparatus may determine an even number of coding units 1412a and 1412b or an odd number of coding units 1414a, 1414b, and 1414c by splitting a first coding unit 1410 having a long rectangular shape in which a height is greater than a width. The image encoding apparatus may use a part index (PID) indicating each coding unit to distinguish each of the plurality of coding units. According to an embodiment, the PID may be obtained from a sample (e.g., an upper left sample) at a predetermined location of each coding unit. An operation of the image encoding apparatus related to FIG. 14 may be opposite to an operation of an image decoding apparatus to be described below with reference to FIG. 14, and thus a detailed explanation thereof will not be given.

Figure 15:
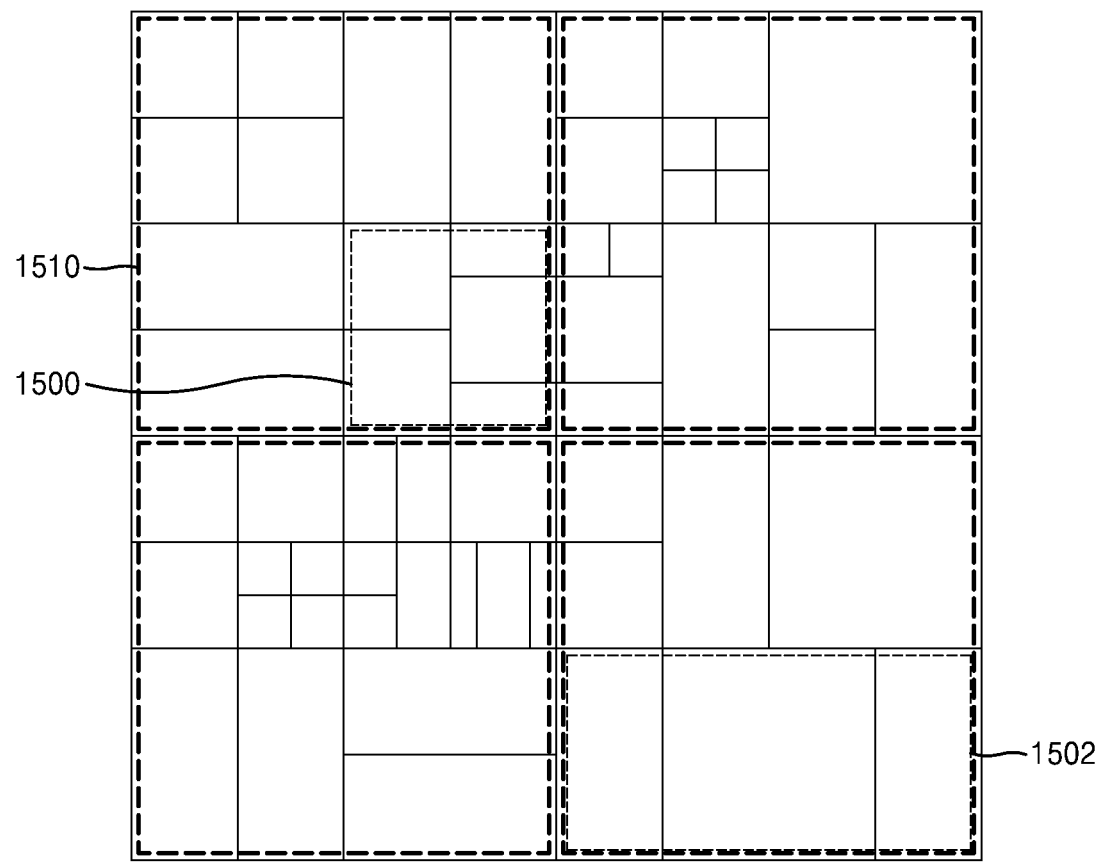
FIG. 15 illustrates that a plurality of coding units are determined according to a plurality of predetermined data units included in a picture, according to an embodiment.

FIG. 15 illustrates that a plurality of coding units are determined according to a plurality of predetermined data units included in a picture according to an embodiment. According to an embodiment, an encoder may use a reference coding unit as a predetermined data unit from which a coding unit starts to be recursively split. An operation by which an image encoding apparatus uses the reference coding unit related to FIG. 15 may be opposite to an operation by which an image decoding apparatus uses the reference coding unit to be described below with reference to FIG. 15, and thus a detailed explanation thereof will not be given.

According to an embodiment, a bitstream generator of the image encoding apparatus may generate, for various data units, a bitstream including at least one of information about a shape of the reference coding unit and information about a size of the reference coding unit. A process of determining at least one coding unit included in a reference coding unit 1500 having a square shape has been described above in a process of splitting a current coding unit, and a process of determining at least one coding unit included in the reference coding unit 1500 having a non-square shape has been described above in the process of splitting the current coding unit, and thus a detailed explanation thereof will not be given.

According to an embodiment, in order to determine a size and a shape of a reference coding unit according to some pre-determined data units based on a predetermined condition, the encoder may use a PID for identifying the size and the shape of the reference coding unit. That is, for each data unit satisfying a predetermined condition (e.g., a data unit having a size equal to or less than a slice) from among the various data units (e.g., a sequence, a picture, a slice, a slice segment, and a largest coding unit), the bitstream generator may generate a bitstream including the PID for identifying the size and the shape of the reference coding unit. The encoder may determine the size and the shape of the reference data unit for each data unit satisfying the predetermined condition by using the PID. According to an embodiment, at least one of the size and the shape of the reference coding unit related to the PID indicating the size and the shape of the reference coding unit may be pre-determined. That is, the encoder may determine at least one of the size and the shape of the reference coding unit included in a data unit that becomes a criterion for obtaining the PID by selecting at least one of the pre-determined size and shape of the reference coding unit according to the PID. An operation of the encoder using the PID for identifying the size and the shape of the reference coding unit may be similar to an operation of a decoder described above, and thus a detailed explanation thereof will not be given.

Figure 16:
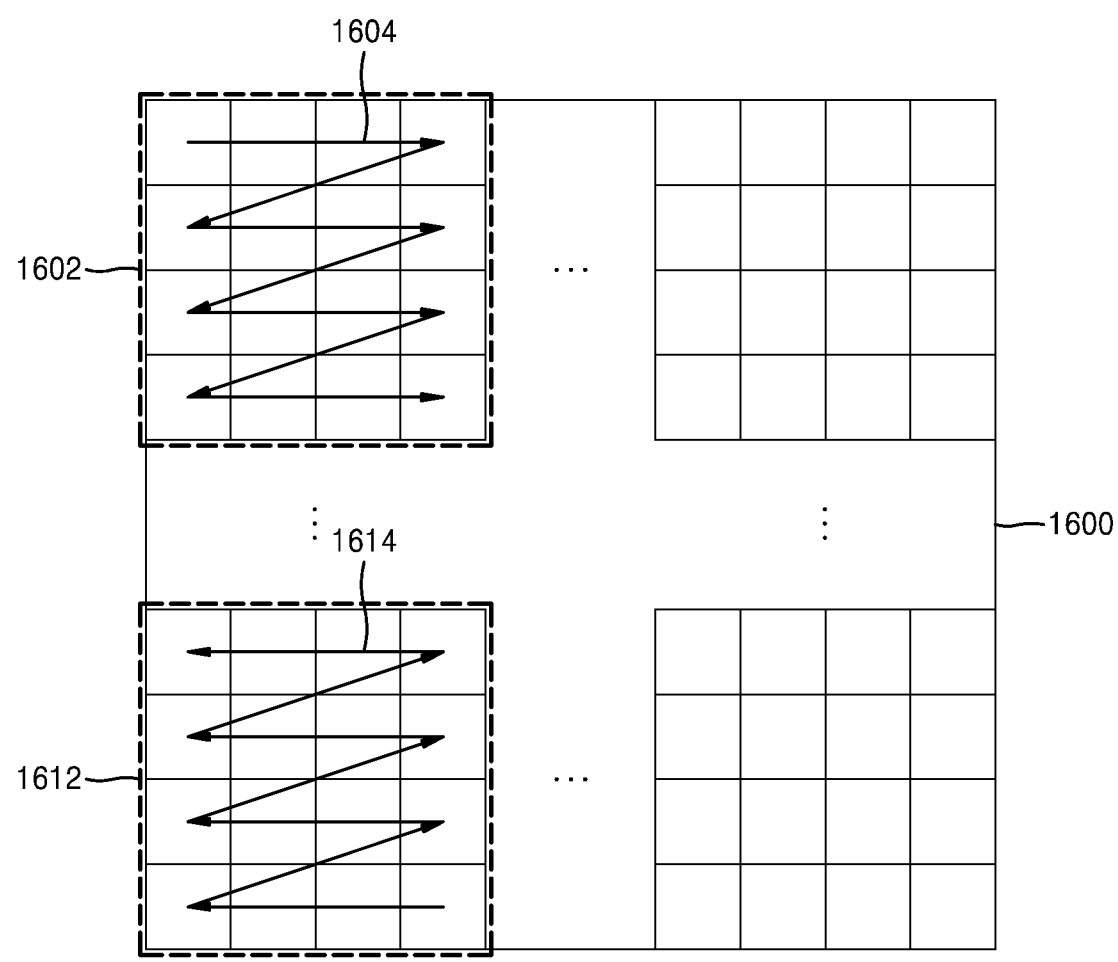
FIG. 16 illustrates a processing block that becomes a criterion for determining a determining order of reference coding units included in a picture, according to an embodiment.

FIG. 16 illustrates a processing block that becomes a criterion for determining a determining order of reference coding units included in a picture 1600 according to an embodiment.

According to an embodiment, an encoder may obtain information about a size of a processing block and may determine a size of at least one processing block included in an image. The encoder may determine the size of the at least one processing block included in the image, and a bitstream generator may generate a bitstream including information about a size of a processing block. The size of the processing block may be a predetermined size of a data unit indicated by the information about a size of a processing block.

According to an embodiment, the bitstream generator of an image encoding apparatus may generate the bitstream including the information about a size of a processing block according to predetermined data units. For example, the bitstream generator may generate the bitstream including the information about a size of a processing block according to data units such as images, sequences, pictures, slices, and slice segments. That is, the bitstream generator may generate the bitstream including the information about a size of a processing block according to such several data units, and the encoder may determine the size of at least one processing block splitting the picture by using the information about a size of a processing block, wherein the size of the processing block may be an integer times a size of a reference coding unit.

According to an embodiment, the encoder may determine sizes of processing blocks 1602 and 1612 included in the picture 1600. For example, the encoder may determine a size of a processing block based on information about a size of a processing block. Referring to FIG. 16, the encoder may determine a horizontal size of each of the processing blocks 1602 and 1612 to be 4 times a horizontal size of a reference coding unit, and a vertical size of each of the processing blocks 1602 and 1612 to be 4 times a vertical size of the reference coding unit according to an embodiment. The encoder may determine a determining order of at least one reference coding unit in at least one processing block. An operation of the encoder related to the processing block may be similar to an operation of a decoder described above with reference to FIG. 16, and thus a detailed explanation thereof will not be given.

According to an embodiment, the bitstream generator of the image encoding apparatus may generate a bitstream including block shape information indicating a shape of a current coding unit or split shape information indicating a method of splitting the current coding unit. The block shape information or the split shape information may be included in a bitstream related to various data units. For example, the bitstream generator of the image encoding apparatus may use the block shape information or the split shape information included in a sequence parameter set, a picture parameter set, a video parameter set, a slice header, and a slice segment header. Furthermore, the bitstream generator of the image encoding apparatus may generate the bitstream including syntax indicating the block shape information or the split shape information according to largest coding units, reference coding units, and processing blocks.

According to an embodiment, the encoder may differently determine types of split shapes into which a coding unit may be split according to predetermined data units. The encoder of the image encoding apparatus may differently determine combinations of shapes into which a coding unit may be split according to predetermined data unit (e.g., sequences, pictures, and slices).

Figure 17:
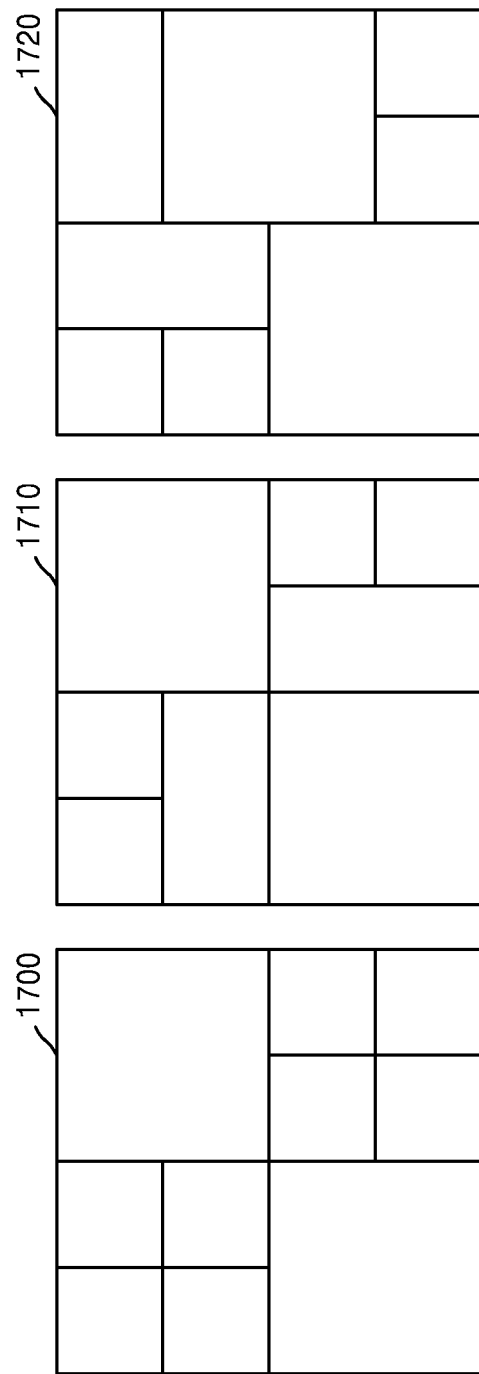
FIG. 17 illustrates coding units that may be determined for each picture when combinations of shapes into which a coding unit may be split are different, according to an embodiment.

FIG. 17 illustrates coding units that may be determined for each picture, when combinations of shapes into a coding unit may be split are different among pictures according to an embodiment.

Referring to FIG. 17, an encoder may differently determine a combination of split shapes into which a coding unit may be split for each picture. For example, the encoder may decode an image by using a picture 1700 that may be split into four coding units, a picture 1710 that may be split into two or four coding units, and a picture 1720 that may be split into two, three, or four coding units from among one or more pictures included in the image. The encoder may split the picture 1700 into four square coding units. The encoder may split the picture 1710 into two or four coding units. The encoder may split the picture 1720 into two, three, or four coding units. The combination of split shapes is merely an embodiment for describing an operation of an image encoding apparatus, and thus the combination of split shapes should not be interpreted as being limited to the embodiment and various combinations of split shapes may be used according to predetermined data units.

According to an embodiment, the encoder of the image encoding apparatus may determine a combination of split shapes into which a coding unit may be split according to predetermined data units by using an index indicating a combination of split shape information, and thus may use the different combination of split shapes according to predetermined data units. Furthermore, a bitstream generator of the image encoding apparatus may generate a bitstream including the index indicating the combination of the split shape information according to predetermined data units (e.g., sequences, pictures, and slices). For example, the bitstream generator may generate the bitstream including the index indicating the combination of the split shape information in a sequence parameter set, a picture parameter set, or a slice.

FIGS. 18 and 19 illustrate various shapes of a coding unit that may be determined based on split shape information that may be represented as a binary code according to an embodiment.

According to an embodiment, an encoder of an image encoding apparatus may split a coding unit into various shapes, and a bitstream generator may generate a bitstream including block shape information and split shape information. Shapes into which the coding unit may be split may correspond to various shapes including shapes described with reference to the above embodiments. Referring to FIG. 18, the encoder may split a coding unit having a square shape in at least one of a horizontal direction and a vertical direction and may split a coding unit having a non-square shape in the horizontal direction or the vertical direction based on the split shape information. Characteristics of a binary code of the split shape information that may be used by the image encoding apparatus may correspond to characteristics of an image decoding apparatus to be described below with reference to FIGS. 18 and 19, and thus a detailed explanation thereof will not be given.

The image encoding apparatus according to an embodiment may generate prediction data by performing inter prediction or intra prediction on a coding unit, may generate residual data by performing transformation on a transform unit included in a current coding unit, and may encode the current coding unit by using the generated prediction data and the generated residual data.

A prediction mode of a coding unit according to an embodiment may be at least one of an intra mode, an inter mode, and a skip mode. According to an embodiment, a prediction mode having a smallest error may be selected by independently performing prediction for each coding unit.

When a coding unit having a 2N×2N shape according to an embodiment is split into two coding units having a 2N×N shape or a N×2N shape, inter mode prediction and intra mode prediction may be separately performed on each coding unit. Also, according to an embodiment, the encoder of the image encoding apparatus may encode a coding unit by using a coding unit (CU) skip mode not only when the coding unit has a square shape but also when the coding unit has a non-square shape. Since an image may be decoded by using a CU skip mode not only for a coding unit having a square shape but also for a coding unit having a non-square shape that may be determined based on at least one of block shape information and split shape information, a skip mode may be more adaptively used, thereby improving image encoding/decoding efficiency. Characteristics of the image encoding apparatus using a skip mode in a coding unit having such a non-square shape may be similar to those described with reference to the use of a skip mode of the image encoding apparatus, and thus a detailed explanation thereof will not be given.

Figure 22:
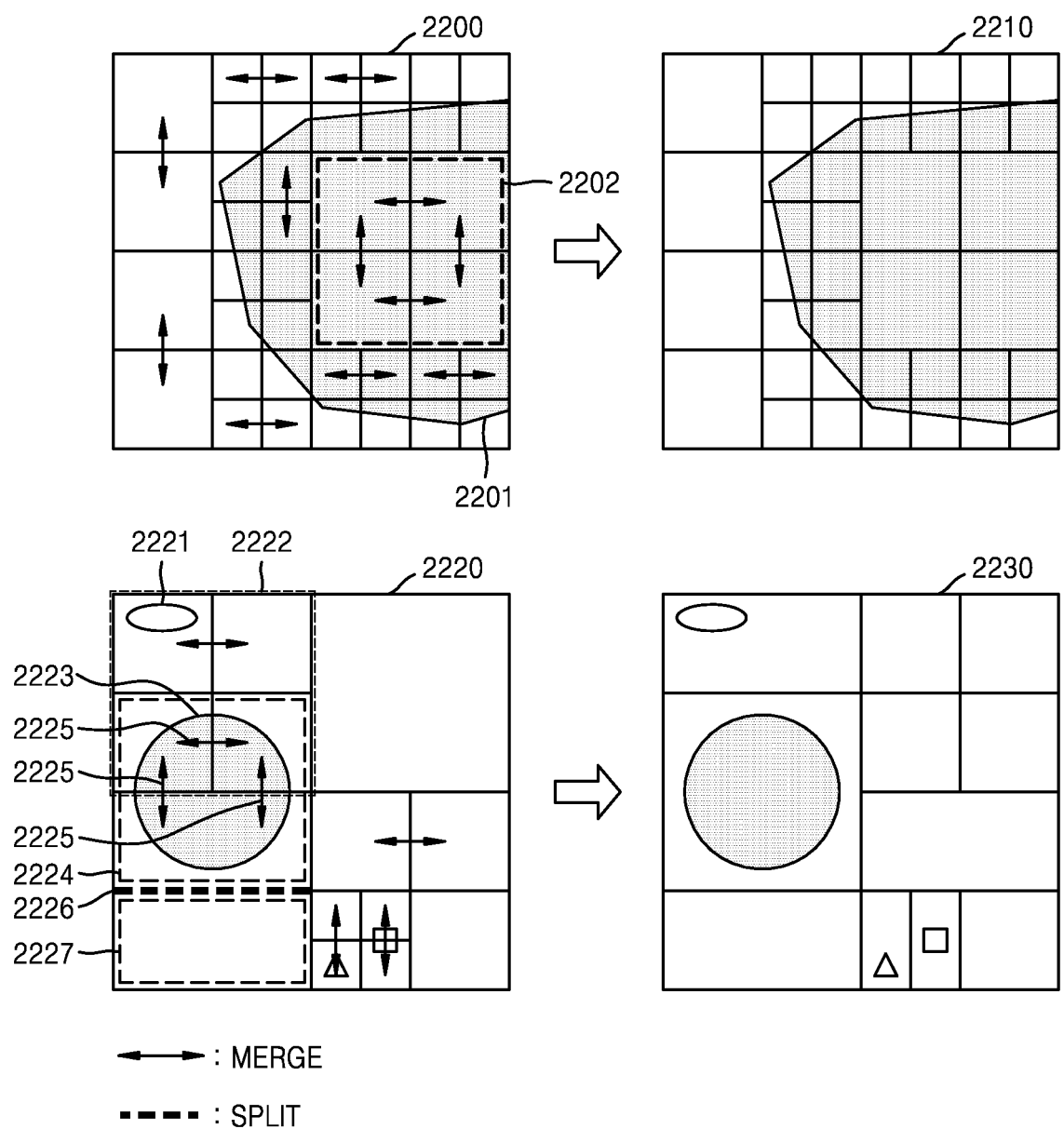
FIG. 22 illustrates a process of performing a merge operation or a split operation on coding units determined according to a predetermined encoding method, according to an embodiment.

FIG. 22 illustrates a process of performing a merge operation or a split operation on coding units determined according to a predetermined encoding method, according to an embodiment.

According to an embodiment, an image encoding apparatus may determine coding units for splitting a picture by using the predetermined encoding method. For example, the image encoding apparatus may determine a coding unit of a current depth or may split the coding unit into four coding units of a lower depth based on split information of the coding unit. As described above, the image encoding apparatus may determine a coding unit by using block shape information indicating that a current coding unit always has a square shape, and split shape information indicating that the current coding unit is not split or split into four square coding units. Referring to FIG. 22, pictures 2200 and 2220 may be split according to square coding units determined according to the predetermined encoding method.

However, when the above-described predetermined decoding unit is used, since whether a current coding unit is split is determined according to whether it is suitable to represent a relatively small object included in the current coding unit, it may be impossible to encode a large object and a small object in a picture through one coding unit. The term 'object' that is a set of samples included in a picture may refer to a region of samples distinguished from other regions as the samples have similar sample values. Referring to FIG. 22, the image encoding apparatus may determine a coding unit for decoding a small object 2221 by splitting a first coding unit 2222 into four coding units of a lower depth in order to reconstruct the small object 2221. However, since a large object 2223 is not included in the first coding unit 2222 that is a current coding unit, it is not suitable to decode the large object 2223 by using the current coding unit 2222, and furthermore, since the current coding unit 2222 is split in order to decode the small object 2221, an unnecessary process of splitting a coding unit has to be performed in order to decode the large object 2223 inefficiently. That is, image encoding may be efficiently performed if the image encoding apparatus may use one coding unit in order to encode a part corresponding to the large object 2223.

According to an embodiment, an encoder of the image encoding apparatus may split a current coding unit by using at least one of block shape information and split shape information, the block shape information may be pre-determined to use only a square shape, and the split shape information may be pre-determined to indicate whether a coding unit is not split or split into four square coding units. Such a process may correspond to a process of determining a coding unit used in the predetermined encoding method described with reference to various embodiments. In this case, in order to merge coding units determined by using the predetermined encoding method or to split the determined coding units, the encoder may use a sample value included in a picture. For example, the encoder may detect various objects included in a picture by examining parts having similar sample values, and may perform a merge/split operation on coding units based on parts corresponding to the detected objects.

Referring to FIG. 22, according to an embodiment, the encoder may determine a plurality of coding units for splitting the picture 2200 by using the predetermined encoding method. However, although there is a part 2201 having a similar sample value included in the picture 2200, a process of splitting a similar region into a plurality of coding units, instead of one coding unit, may be performed. In this case, even when coding units are determined by using the predetermined encoding method, the coding units may be merged into one coding unit 2202 and may be encoded as one coding unit. Referring to FIG. 22, according to another embodiment, the encoder may split the coding unit 2222 for encoding the small object 2221 into four coding units by using the predetermined encoding method. Since the large object 2223 may not be included in all of the four coding units, the encoder may perform a merge operation 2225 by merging the coding units into one coding unit including a part having a similar sample value.

According to an embodiment, the encoder may determine a coding unit by using a predetermined encoding method of not splitting or splitting a coding unit into four coding units by using split information of the coding unit, and then may split again the coding unit in consideration of sample values of samples included in a picture. That is, in order to determine a coding unit for each object, the encoder 130 may perform not only a merge operation on coding units but also a split operation on a determined coding unit. Referring to FIG. 22, since the encoder 130 may merge coding units for the large object 2223, and then may perform a split operation 2226 again on the merged coding units for the large object 2223 in order to determine an optimized coding unit for the large object 2223. That is, the encoder may determine a part not including the large object 2223 as a coding unit 2227 separate from the large object 2223 through the split operation 2226.

When a merge operation or a split operation is performed on coding units determined according to a predetermined encoding method through an operation of the image encoding apparatus and then a bitstream for an image is generated, an image decoding apparatus may obtain the bitstream and then may decode the image by performing an image decoding method in reverse order to an order in which the image encoding method is performed.

Figure 23:
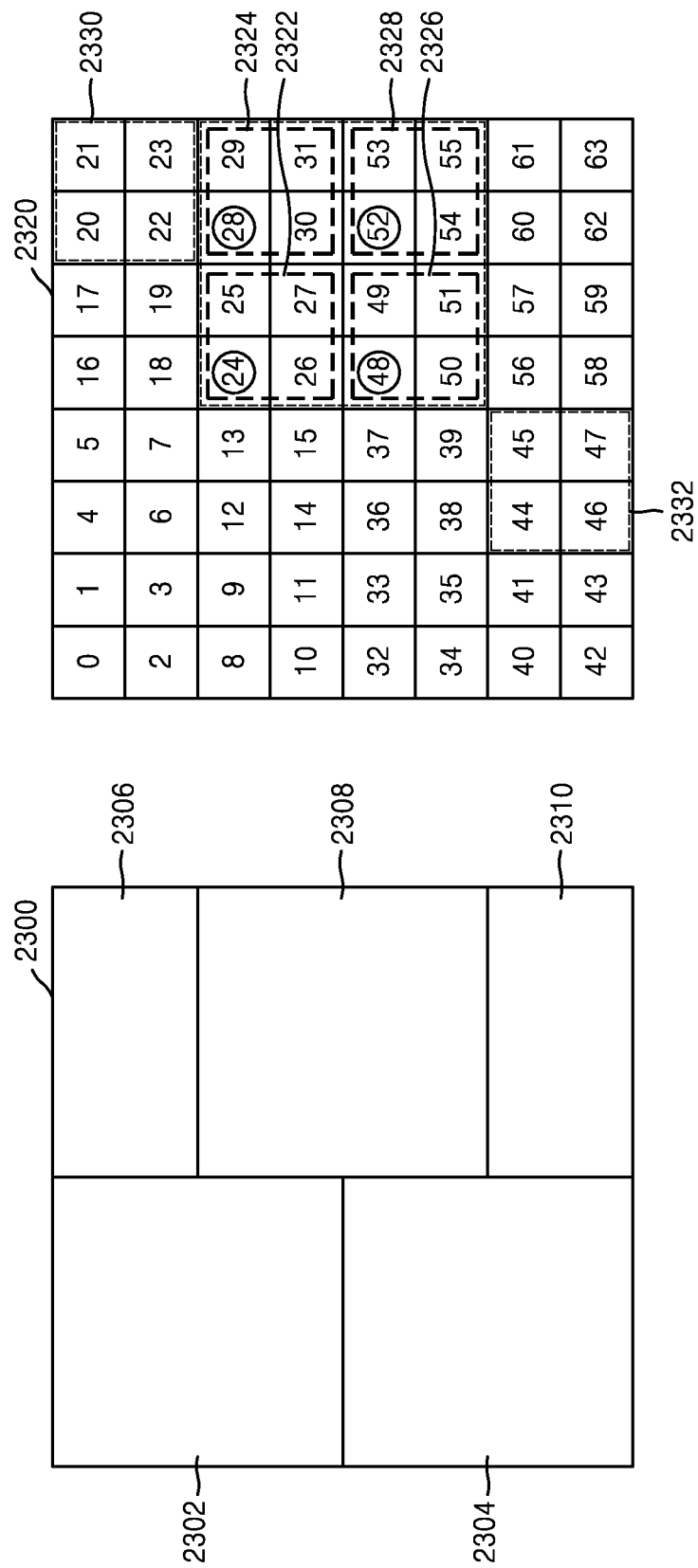
FIG. 23 illustrates an index according to a Z-scan order of a coding unit, according to an embodiment.

FIG. 23 illustrates an index according to a Z-scan order of a coding unit, according to an embodiment.

An encoder of an image encoding apparatus according to an embodiment may scan lower data units included in an upper data unit according to a Z-scan order. Also, the image encoding apparatus according to an embodiment may sequentially access data according to a Z-scan index in a coding unit included in a processing block or a largest coding unit. In this case, coding units having a square shape and coding units having a non-square shape may exist together in a reference coding unit. Characteristics of an index according to a Z-scan order of a coding unit of the image encoding apparatus may be similar to characteristics of an image decoding apparatus to be described below with reference to FIG. 23, and thus a detailed explanation thereof will not be given.

The above-described various embodiments are for describing an operation related to an image encoding method performed by the image encoding apparatus. An operation of the image decoding apparatus that performs an image decoding method in reverse order to an order in which the image encoding method is performed will now be described with reference to various embodiments.

Figure 2:
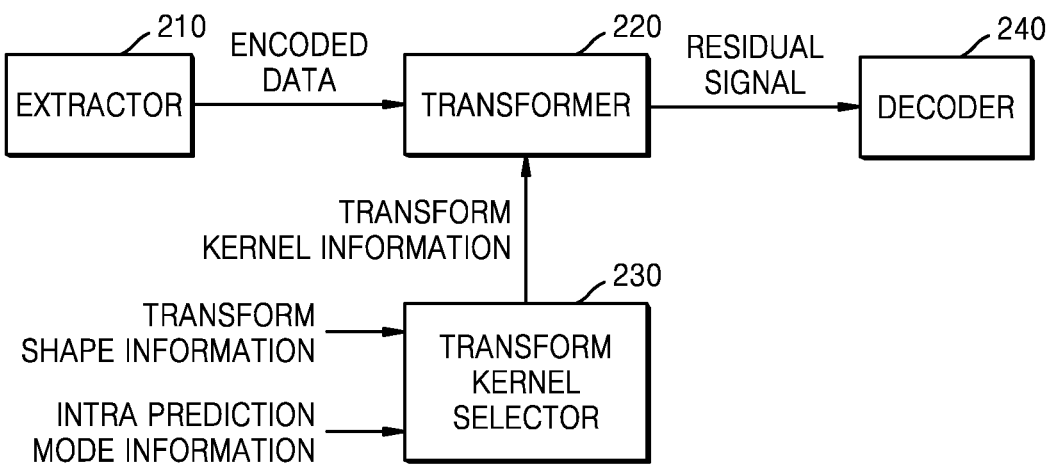
FIG. 2 is a block diagram of a decoding apparatus including a transform kernel selector that adaptively selects a transform kernel based on a transform shape, and an inverse transformer, according to an embodiment.

FIG. 2 is a block diagram of a decoding apparatus including an extractor 210, a transform kernel selector 230 that adaptively selects a transform kernel based on a transform shape, a transformer 220, and a decoder 240, according to an embodiment.

Referring to FIG. 2, the extractor 210 may obtain data of a current coding unit and transform shape information about a size or a shape of a residual block for the current coding unit from a parsed bitstream.

According to an embodiment, when the extractor 210 obtains current encoded data, the transformer 220 may perform transformation. Also, the transform kernel selector 230 may determine transform kernel information about a transform kernel to be applied and may apply the determined transform kernel information as an input to the transformer 220. For example, the encoded data may include information about a transform coefficient obtained from a residual signal.

According to an embodiment, the transform kernel selector 230 may receive the transform shape information as a basic input. For example, the transform shape information may include information about a size and a shape of a current transform. In more detail, the transform shape information about the shape may include information about whether a transform shape is a square shape, a non-square shape, or an arbitrary shape. Also, when the transform shape is a non-square shape or an arbitrary shape, the transform shape information about the shape may include information about a detailed shape (e.g., a horizontal or vertical length). The transform shape information about the size may include information about vertical and horizontal lengths of a square transform, a non-square transform, or an arbitrary transform. Also, when the transform shape is an arbitrary shape, the transform shape information about the size may further include information about a diagonal length.

According to an embodiment, the transform kernel selector 230 may obtain information indicating whether the residual signal included in the data of the coding unit obtained from the bitstream is a signal obtained by performing intra prediction. For example, the transform kernel selector 230 may obtain prediction information indicating whether the residual signal included in the data of the coding unit obtained from the bitstream is a signal obtained by performing intra prediction. The prediction information may indicate whether the residual signal obtained from the bitstream is a signal obtained by performing intra prediction or a signal obtained by performing inter prediction.

According to an embodiment, when the residual signal obtained from the bitstream is obtained by intra prediction, the transform kernel selector 230 may obtain information (i.e., intra prediction mode information) about an intra prediction mode used in the intra prediction. For example, the intra prediction mode may indicate an index in an Intra_DC mode, an Intra Planar mode, and an Intra Angular mode. When the residual signal obtained from the bitstream is obtained by inter prediction, the transform kernel selector 230 may not receive the intra prediction mode information as an input.

Examples of the intra prediction mode for a luminance component may include the Intra Planar mode, the Intra DC mode, and the Intra Angular mode. In more detail, in the Intra Planar mode, a prediction value may be generated by averaging values obtained by performing linear interpolation (interpolation using a weight according to a distance) in horizontal and vertical directions on values obtained by copying reference pixels. Also, in the Intra_DC mode, an average value of neighboring pixels of a current block may be used as a prediction value. Prediction in the Intra DC mode may be performed by filtering samples located at a boundary of a prediction block in order to remove discontinuity between a prediction sample and reference samples, without using an average value for a block to be predicted as the prediction sample. Also, in the Intra Angular mode, a prediction sample may be obtained in consideration of directionality when the prediction sample is calculated from reference samples. Directionality according to each mode in the Intra Angular mode will be described below with reference to FIG. 6.

Also, examples of the intra prediction mode for a chrominance component may include the Intra DC mode, an Intra Vertical mode, an Intra-Horizontal mode, and an Intra_DM mode. The modes other than the Intra_DM mode may generate a prediction sample by using the same process as the method described for the luminance component. In the Intra_DM mode, a mode of a chrominance component may be used as the same mode as that of a luminance component by using the feature that the luminance component and the chrominance component are similar to each other.

According to an embodiment, the transformer 220 may apply transformation to the original residual signal based on the transform kernel information determined and transmitted as an input by the transform kernel selector 230, and then may output a reconstructed transform coefficient as a result of the transformation.

For example, the transform kernel selector 230 may adaptively select a transform kernel based on at least one of the transform shape information and the intra prediction mode information. For example, the transform kernel selector 230 may send the transform kernel information about the adaptively selected transform kernel to the transformer 220. In this case, the transformer 220 may perform transformation on the original residual signal by applying the selected transform kernel based on the received transform kernel information. A kernel that is a DCT or approximates a DCT to an integer transform may be used as the transform kernel, and when the residual signal is a signal having a size of 4×4 obtained by intra prediction, a kernel obtained by approximating a DST may be used. For example, types of the transform kernel may include transform kernels obtained by integerizing DCT-5, DCT-8, DST-1, and DST-7 transforms. Also, when the residual signal is a signal to which intra prediction is applied, types of the transform kernel may include a transform kernel obtained by offline training for each intra prediction mode and transform shapes. Also, when the residual signal is a signal to which inter prediction is applied, types of the transform kernel may include a transform kernel obtained by offline training according to each transform shape besides DCT and DST transforms. The types of the transform kernel are merely examples, and the present disclosure is not limited thereto.

For example, the transform kernel selector 230 may select a kernel to be used for a current transform unit from among a plurality of pre-defined candidate transform kernels, may apply the selected kernel, and may additionally transmit information about the selected kernel. In this case, the set of candidate kernels may be fixed in a coding unit to which inter prediction is applied, and may vary according to a prediction mode in a coding unit to which intra prediction is applied. Also, for example, the transformer 220 may perform secondary transformation where a transform is applied again to a transform coefficient obtained after primary transformation. In more detail, ROT may involve splitting a transform coefficient into 4×4 units, selecting one from among pre-determined secondary transformations, and applying the selected secondary transformation. Also, in NSST that operates like the ROT, a transform kernel may be non-separable and a secondary transform kernel candidate to be applied may vary based on an intra prediction mode.

According to an embodiment, a decoder 240 may perform decoding based on the transform coefficient generated by the transformer 220. For example, when a reconstructed differential coefficient signal is generated by applying an inverse transform, the decoder 240 may decode an image by adding a reconstructed differential coefficient value to a prediction block. In this case, the derived prediction block may be the same when the residual coefficient is obtained and the image is decoded.

FIG. 3 illustrates a transform shape applicable during transformation, according to an embodiment.

According to an embodiment, an image decoding apparatus may split a coding unit into various shapes by using block shape information and split shape information obtained by a bitstream obtainer. Shapes into which the coding unit may be split may correspond to various shapes including shapes described with reference to the above embodiments.

According to an embodiment, a shape of a residual block may be a square shape obtained by splitting a coding unit having a square shape in at least one of a horizontal direction and a vertical direction, or may be a non-square shape obtained by splitting a coding unit having a non-square shape in the horizontal direction or the vertical direction.

According to an embodiment, transform shape information may be represented as a two-digit binary code, and a binary code may be assigned to each transform shape. For example, when a coding unit is not split, the transform shape information may be represented as (00)b; when a coding unit is split in the horizontal direction and the vertical direction, the transform shape information may be represented as (01)b; when a coding unit is split in the horizontal direction, the transform shape information may be represented as (10)b; and when a coding unit is split in the vertical direction, the transform shape information may be represented as (11)b.

Also, for example, a coding unit may be split into two coding units, and in this case, the transform shape information may be represented as (10)b. Also, a coding unit may be split into three coding units, and in this case, the transform shape information may be represented as (11)b. Also, it may be determined that a coding unit is not split, and in this case, the transform shape information may be represented as (0)b. In order to use a binary code indicating the transform shape information, VLC, instead of FLC, may be used.

FIG. 4 illustrates that a transform kernel is assigned according to whether separation is vertical separation or horizontal separation, according to an embodiment.

According to an embodiment, the transform kernel selector 230 may determine a shape of a residual block (i.e., whether the shape of the residual block is a square shape or a non-square shape), and may determine whether transformation may be performed by separating a residual signal in a vertical direction and a horizontal direction. For example, the transform kernel selector 230 may include the feature that the residual signal is separable in transform kernel information and may send the transform kernel information to a transformer.

According to an embodiment, when the feature the residual signal is separable is included, the transform kernel selector 230 may determine to select each transform kernel based on transform shape information of the residual signal in each of the vertical direction and the horizontal direction.

For example, when the transform kernel information about the residual block 410 includes the feature that the shape of the residual block is a square shape or a non-square shape and is separable, the transform kernel information may include information about a transform kernel to be applied in each of the vertical and horizontal directions. In contrast, when the shape of the residual block is a square shape or a non-square shape and is non-separable or when a transform is an arbitrary transform, like in the residual block 420, the transform kernel information may include information about one transform kernel irrespective of an application direction.

FIG. 5 is a block diagram of a transform kernel selector including the transform kernel candidate deriver 510 and the transform kernel determiner 520, according to an embodiment.

According to an embodiment, the transform kernel selector may include the transform kernel candidate deriver 510 and the transform kernel determiner 520. The transform kernel candidate deriver 510 may receive, as an input, transform shape information and intra prediction mode information from a bitstream, and may derive transform kernel candidates to be applied to a current residual signal based on at least one of the transform shape information and the intra prediction mode information. The intra prediction mode information may be sent to the transform kernel candidate deriver 510 only when the current residual signal is obtained by intra prediction.

According to an embodiment, the transform kernel candidates may include one or more sets of transform kernel candidates. For example, transform kernels obtained by integerizing DCT-5, DCT-8, DST-1, and DST-7 transforms may be included in the transform kernel candidates. Also, when the residual signal is a residual signal to which intra prediction is applied, a transform kernel obtained by offline training for each intra prediction mode and transform shapes may be included in the transform kernel candidates. Also, when the residual signal is a residual signal to which inter prediction is applied, a transform kernel obtained by offline training according to each transform shape besides DCT and DST transforms may be included in types of the transform kernel candidates. The transform kernel candidates may be merely examples, and the present disclosure is not limited thereto.

According to an embodiment, the number of the transform kernel candidates may be determined based on at least one of the transform shape information and the intra prediction mode information. For example, the number of the transform kernel candidates may be determined according to a vertical or horizontal length when a transform shape is a square shape, a non-square shape, or an arbitrary shape. Also, for example, the number of the transform kernel candidates may be determined according to whether an intra prediction mode is a Planar mode or a DC mode without directionality or has directionality.

The transform kernel determiner 520 may receive, as an input, the transform kernel candidates from the transform kernel candidate deriver 510, may receive, as an input, a transform kernel index from the bitstream, may determine a transform kernel to be applied to the current residual signal, and may send transform kernel information to a transformer.

According to an embodiment, the transform kernel index may include index information about a kernel to be applied to the current residual signal from among the plurality of transform kernel candidates. For example, the transform kernel index may be applied, as an input, only when the transform kernel candidates include a plurality of sets of transform kernel candidates, and the transform kernel index may be included in the bitstream as described above. For example, when the number of the transform kernel candidates output by the transform kernel candidate deriver 510 is 1, the transform kernel determiner 520 may determine the single input as a transform kernel, and may send transform kernel information to the transformer. For example, when a transform is a square transform or a non-square transform and is separable, a process of deriving transform kernel candidates and determining a transform kernel may be performed in each of a vertical direction and a horizontal direction, and transform kernel information about vertical and horizontal transforms may be output.

FIG. 6 illustrates information about an intra prediction mode according to an embodiment.

According to an embodiment, the transform kernel selector 230 may obtain intra prediction mode information from a bitstream, and new 67 prediction modes obtained by adding 32 prediction modes 620 to existing 35 prediction modes 610 may be included in the intra prediction mode.

For example, when intra prediction is performed by using both the left and top data units 630 or the right and bottom data units 640 according to the intra prediction mode, the transform kernel selector 230 may obtain intra prediction mode information used in each intra prediction, and may select a transform kernel based on each obtained intra prediction mode information.

FIGS. 7A and 7B are flowcharts of a process of deriving transform kernel candidates according to an embodiment.

FIG. 7A is a flowchart of a process of deriving transform kernel candidates when a current residual signal is a signal obtained by intra prediction.

According to an embodiment, encoded data of a current coding unit and transform shape information about a size or a shape of a residual block including a residual signal for the current coding unit may be obtained from a bitstream.

According to an embodiment, it may be determined whether a shape of a current residual block is a rectangular shape (e.g., a square shape or a non-square shape) or an arbitrary shape based on the transform shape information obtained from the bitstream.

In more detail, in operation S711, it may be determined whether a shape of a current residual block is a rectangular shape based on transform shape information obtained from a bitstream, and when the shape is a rectangular shape, in operation S712, it may be determined that the shape is a square shape or a non-square shape. In contrast, when it is determined in operation S711 based on the transform shape information obtained from the bitstream that the shape of the current residual block is not a rectangular shape, it may be determined that the shape of the current residual block is an arbitrary shape.

According to an embodiment, when it is determined based on the transform shape information that the shape of the current residual block is a rectangular shape (i.e., a square shape or a non-square shape), it may be determined whether a transform is separable or non-separable in each of a vertical direction and a horizontal direction.

In more detail, when the shape of the current residual block is a square shape, in operation S713, it may be determined whether the transform is separable. When the shape of the current residual block is a non-square shape, in operation S714, it may be determined that the transform is separable. For example, when the transform is separable in each of the vertical direction and the horizontal direction, transform kernel candidates in each of the vertical direction and the horizontal direction may be derived.

According to an embodiment, when the transform shape information and whether the transform is separable are determined, the transform kernel candidates may be determined based on the transform shape information and whether the transform is separable.

In more detail, when the shape of the current residual block is a square shape and the transform is separable, in operation S715, the transform kernel selector 230 may obtain the transform kernel candidates in each of the vertical direction and the horizontal direction based on an intra prediction mode. When the shape of the current residual block is a square shape and the transform is non-separable, in operation S716, the transform kernel selector 230 may obtain the transform kernel candidates based on the intra prediction mode. When the shape of the current residual block is a non-square shape and the transform is separable, in operation S717, the transform kernel selector 230 may obtain the transform kernel candidates in each of the vertical direction and the horizontal direction based on the intra prediction mode and vertical and horizontal lengths of a non-square transform. When the shape of the current residual block is a non-square shape and the transform is non-separable, in operation S718, the transform kernel selector 230 may obtain the transform kernel candidates based on the intra prediction mode and the vertical and horizontal lengths of the non-square transform. When the shape of the current residual block is an arbitrary shape, in operation S719, the transform kernel selector 230 may obtain the transform kernel candidates based on a shape of an arbitrary residual block, a scan order of residual signal samples performed in a pre-step of the transformation, and the intra prediction mode.

FIG. 7B is a flowchart of a process of deriving transform kernel candidates when a current residual signal is a signal obtained by inter prediction.

According to an embodiment, encoded data of a current coding unit and transform shape information about a size or a shape of a residual block including a residual signal for the current coding unit may be obtained from a bitstream.

According to an embodiment, it may be determined whether a shape of a current residual block is a rectangular shape (e.g., a square shape or a non-square shape) or an arbitrary shape based on the transform shape information obtained from the bitstream.

In more detail, when it is determined in operation S721 that a shape of a current residual block is a rectangular shape based on transform shape information obtained from a bitstream, and when the shape is a rectangular shape, in operation S722, it may be determined whether the shape is a square shape or a non-square shape. In contrast, when it is determined in operation S721 based on the transform shape information obtained from the bitstream that the shape of the current residual block is not a rectangular shape, it may be determined that the shape of the current residual block is an arbitrary shape.

According to an embodiment, when it is determined based on the transform shape information that the shape of the current residual block is a rectangular shape (i.e., a square shape or a non-square shape), it may be determined whether a transform is separable or non-separable in each of a vertical direction and a horizontal direction.

In more detail, when the shape of the current residual block is a square shape, in operation S723, it may be determined whether the transform is separable. When the shape of the current residual block is a non-square shape, in operation S724, it may be determined whether the transform is separable. For example, when the transform is separable in each of the vertical direction and the horizontal direction, transform kernel candidates in each of the vertical direction and the horizontal direction may be derived.

According to an embodiment, when the transform shape information and whether the transform is separable are determined, the transform kernel candidates may be determined based on the transform shape information and whether the transform is separable.

In more detail, when the shape of the current residual block is a square shape and the transform is separable, in operation S725, the transform kernel selector 230 may obtain the transform kernel candidates that are pre-determined in each of the vertical direction and the horizontal direction. When the shape of the current residual block is a square shape and the transform is non-separable, in operation S716, the transform kernel selector 230 may obtain the pre-determined transform kernel candidates. When the shape of the current residual block is a non-square shape and the transform is separable, in operation S717, the transform kernel selector 230 may obtain the transform kernel candidates in each of the vertical direction and the horizontal direction based on vertical and horizontal lengths of a non-square transform. When the shape of the current residual block is a non-square shape and the transform is non-separable, in operation S718, the transform kernel selector 230 may obtain the transform kernel candidates based on the vertical and horizontal lengths of the non-square transform. When the shape of the current residual block is an arbitrary shape, in operation S719, the transform kernel selector 230 may obtain the transform kernel candidates based on a shape of an arbitrary residual block and a scan order of residual samples performed in a pre-step of the transformation.

Figure 9:
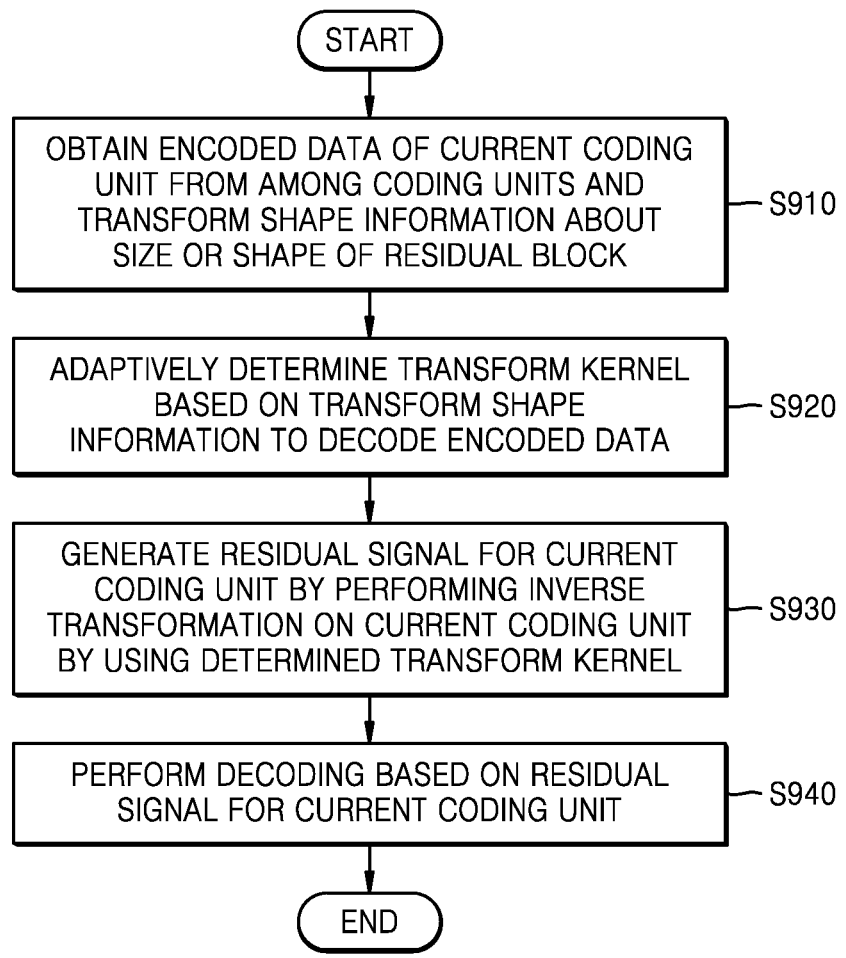
FIG. 9 is a flowchart of a method of performing transformation by adaptively selecting the transform kernel selector at a decoding end, according to an embodiment.

FIG. 9 is a flowchart of a method of performing transformation by adaptively selecting the transform kernel selector 230 at a decoding end, according to an embodiment.

In operation S910, the extractor 210 may extract data of a current coding unit from among coding units that are data units for encoding a current picture of an encoded video and transform shape information about a size or a shape of a residual block for the current coding unit from a parsed bitstream.

In operation S920, the transform kernel selector 230 may adaptively determine a transform kernel based on the transform shape information obtained from the bitstream in order to decode encoded data.

According to an embodiment, the transform shape information may include information about a size and a shape of a current transform. In more detail, the transform shape information about the shape may include information about whether a transform shape is a square shape, a non-square shape, or an arbitrary shape. Also, when the transform shape is a non-square shape or an arbitrary shape, the transform shape information about the shape may include information about a detailed shape (e.g., a horizontal or vertical length).

According to an embodiment, the transform kernel selector 230 may obtain information (i.e., intra prediction mode information) about an intra prediction mode used in intra prediction. However, when an input residual signal is obtained by inter prediction, the transform kernel selector 230 may not receive the intra prediction mode information as an input. Examples of the intra prediction mode may include an Intra Planar mode, an Intra DC mode, and an Intra Angular mode. New 67 prediction modes obtained by adding 32 prediction modes to existing 35 prediction modes may be included in the Intra-Angular mode.

According to an embodiment, the transform kernel selector 230 may include the feature that the residual signal is separable in a horizontal direction and a vertical direction in transform kernel information and may send the transform kernel information to the transformer 220.

For example, when the feature that the residual signal is separable is included, the transform kernel selector 230 may determine to select each transform kernel based on the transform shape information in each of the vertical direction and the horizontal direction of the residual signal. In contrast, when the feature that the residual signal is non-separable is included, the transform kernel information may include information about one transform kernel irrespective of an application direction.

According to an embodiment, a transform kernel candidate deriver of the transform kernel selector 230 may obtain the intra prediction mode information and the transform shape information from the bitstream, and may derive transform kernel candidates to be applied to a current residual signal. Also, a transform kernel determiner of the transform kernel selector 230 may receive, as an input, the transform kernel candidates from the transform kernel candidate deriver, may receive, as an input, a transform kernel index from the bitstream, may determine a transform kernel to be applied to the current residual signal, and may send the transform kernel information to the transformer 220.

When the number of the transform kernel candidates output by the transform kernel candidate deriver is 1, the transform kernel determiner may determine the single input as a transform kernel, and may send the transform kernel information to the transformer 220. Alternatively, when a transform is a square transform or a non-square transform and is separable, a process of deriving transform kernel candidates and determining a transform kernel may be performed in each of the vertical and horizontal directions, and the transform kernel information about vertical and horizontal transforms may be output.

In operation S930, the transformer 220 may generate a residual signal for the current coding unit by performing transformation on the current coding unit by using the determined transform kernel.

According to an embodiment, the transformer 220 may generate a reconstructed residual signal by performing de-quantization and inverse transformation.

In operation S940, the decoder 240 may perform decoding based on the generated residual signal.

According to an embodiment, the decoder 240 may reconstruct the current coding unit by using prediction data and the generated residual signal.

FIG. 10 illustrates that shapes into which second coding units may be split by an image decoding apparatus are restricted when the second coding units having a non-square shape split and determined from the first coding unit 1000 satisfy a predetermined condition, according to an embodiment.

According to an embodiment, the decoder 240 may determine that the first coding unit 1000 having a square shape is split into the second coding units 1010a, 1010b, 1020a, and 1020b having a non-square shape based on at least one of block shape information and split shape information obtained by a bitstream obtainer. The second coding units 1010a, 1010b, 1020a, and 1020b may be independently split. Accordingly, the decoder 240 may determine that each of the second coding units 1010a, 1010b, 1020a, and 1020b is slit or not split into a plurality of coding units based on at least one of block shape information and split shape information related to each of the second coding units 1010a, 1010b, 1020a, and 1020b. According to an embodiment, the decoder 240 may determine third coding units 1012a and 1012b by splitting, in a horizontal direction, the second coding unit 1010a at the left having a non-square shape, which is determined when the first coding unit 1000 is split in a vertical direction. However, when the second coding unit 1010a at the left is split in the horizontal direction, the decoder 240 may set a limit so that the second coding unit 1010b at the right is not split in the same direction, i.e., the horizontal direction, as the direction in which the second coding unit 1010a at the left is split. When third coding units 1014a and 1014b are determined when the second coding unit 1010b at the right is split in the same direction, the third coding units 1012a, 1012b, 1014a, and 1014b may be determined when the second coding unit 1010a at the left and the second coding unit 1010b at the right are each independently split in the horizontal direction. However, this is the same result as that obtained when the decoder 240 splits the first coding unit 1000 into four second coding units 1030a, 1030b, 1030c, and 1030d having a square shape based on at least one of block shape information and split shape information, and thus may be inefficient in terms of image decoding.

According to an embodiment, the decoder 240 may determine third coding units 1022a, 1022b, 1024a, and 1024b by splitting, in the vertical direction, the second coding unit 1020a or 1020b having a non-square shape determined when a first coding unit 900 is split in the horizontal direction. However, when one of the second coding units (e.g., the second coding unit 1020a at the top) is split in the vertical direction, the decoder 240 may set a limit so that the other second coding unit (e.g., the second coding unit 1020b at the bottom) is not split in the vertical direction like the second coding unit 1020a at the top for the above-described reasons.

FIG. 11 illustrates a process by which an image decoding apparatus splits a coding unit having a square shape when split shape information is unable to indicate that a coding unit is split into four square coding units, according to an embodiment.

According to an embodiment, the decoder 240 may determine second coding units 1110a, 1110b, 1120a, and 1120b by splitting a first coding unit 1100 based on at least one of block shape information and split shape information. The split shape information may include information about various shapes into which a coding unit may be split, but such information about various shapes may not include information for splitting a coding unit into four square coding units. According to such split shape information, the decoder 240 is unable to split the first coding unit 1100 having a square shape into four second coding units 1130a through 1130d having a square shape. The decoder 240 may determine the second coding units 1110a, 1110b, 1120a, and 1120b having a non-square shape based on the split shape information.

According to an embodiment, the decoder 240 may independently split each of the second coding units 1110a and 1110b, or 1120a and 1120b having a non-square shape. The second coding units 1110a, 1110b, 1120a, and 1120b may be split in a predetermined order via a recursive method that may be a split method similar to a method of splitting the first coding unit 1100 based on at least one of the block shape information and the split shape information.

For example, the decoder 240 may determine third coding units 1112a and 1112b having a square shape by splitting the second coding unit 1110a at the left in a horizontal direction, and determine third coding units 1114a and 1114b having a square shape by splitting the second coding unit 1110b at the right in the horizontal direction. In addition, the decoder 240 may determine third coding units 1116a through 1116d having a square shape by splitting both the second coding unit 1110a at the left and the second coding unit 1110b at the right in the horizontal direction. In this case, coding units may be determined in the same manner as when the first coding unit 1100 is split into four second coding units 1130a through 1130d having a square shape.

As another example, the decoder 240 may determine third coding units 1122a and 1122b having a square shape by splitting the second coding unit 1120a at the top in a vertical direction, and determine third coding units 1124a and 1124b having a square shape by splitting the second coding unit 1120b at the bottom in the vertical direction. In addition, the decoder 240 may determine the third coding units 1122a, 1122b, 1124a, and 1124b having a square shape by splitting both the second coding unit 1120a at the top and the second coding unit 1120b at the bottom in the vertical direction. In this case, coding units may be determined in the same manner as when the first coding unit 1100 is split into the four second coding units 1130a through 1130d having a square shape.

FIG. 12 illustrates that an order of processing a plurality of coding units may vary according to a process of splitting a coding unit, according to an embodiment.

According to an embodiment, the decoder 240 may split the first coding unit 1200 based on block shape information and split shape information. When the block shape information indicates a square shape and the split shape information indicates that the first coding unit 1200 is split in at least one of a horizontal direction and a vertical direction, the decoder 240 may determine the second coding units 1210a, 1210b, 1220a, 1220b, 1230c, and 1230d by splitting the first coding unit 1200. Referring to FIG. 12, the second coding units 1210a 1210b, 1220a, and 1220b having a non-square shape and determined by splitting the first coding unit 1200 in the horizontal direction or the vertical direction may be independently split based on block shape information and split shape information. For example, the decoder 240 may determine the third coding units 1216a through 1216d by respectively splitting, in the horizontal direction, the second coding units 1210a and 1210b generated as the first coding unit 1200 is split in the vertical direction, or determine the third coding units 1226a through 1226d by respectively splitting, in the horizontal direction, the second coding units 1220a and 1220b generated as the first coding unit 1200 is split in the horizontal direction. A process of splitting the second coding units 1210a, 1210b, 1220a, and 1220b have been described above with reference to FIG. 10, and thus a detailed explanation thereof will not be given.

According to an embodiment, the decoder 240 may process coding units according to a predetermined order. Characteristics about processing coding units according to a predetermined order have been described above, and thus a detailed explanation thereof will not be given. Referring to FIG. 12, the decoder 240 may determine four third coding units 1216a through 1216d or 1226a through 1226d having a square shape by splitting the first coding unit 1200 having a square shape. According to an embodiment, the decoder 240 may determine an order of processing the third coding units 1216a through 1216d or 1226a through 1226d based on how the first coding unit 1200 is split.

According to an embodiment, the decoder 240 may determine the third coding units 1216a through 1216d by splitting, in the horizontal direction, the second coding units 1210a and 1210b generated as the first coding unit 1200 is split in the vertical direction, and may process the third coding units 1216a through 1216d according to an order 1217 of first processing, in the vertical direction, the third coding units 1216a and 1216b included in the second coding unit 1210a at the left, and then processing, in the vertical direction, the third coding units 1216c and 1216d included in the second coding unit 1210b at the right.

According to an embodiment, the decoder 240 may determine the third coding units 1226a through 1226d by splitting, in the vertical direction, the second coding units 1220a and 1220b generated as the first coding unit 1200 is split in the horizontal direction, and the decoder 240 may process the third coding units 1226a through 1226d according to an order 1227 of first processing, in the horizontal direction, the third coding units 1226a and 1226b included in the second coding unit 1220a at the top, and then processing, in the horizontal direction, the third coding units 1226c and 1226d included in the second coding unit 1220b at the bottom.

Referring to FIG. 12, the third coding units 1216a through 1216d or 1226a through 1226d having a square shape may be determined when the second coding units 1210a and 1210b, or 1220a and 1220b are each split. The second coding units 1210a and 1210b determined when the first coding unit 1200 is split in the vertical direction and the second coding units 1220a and 1220b determined when the first coding unit 1200 is split in the horizontal direction are split into different shapes, but according to the third coding units 1216a through 1216d and 1226a through 1226d determined afterwards, the first coding unit 1200 is split into coding units having the same shape. Accordingly, the decoder 240 may process a plurality of coding units determined to have the same shape in different orders even when the coding units having the same shape are consequently determined by recursively splitting coding units through different processes based on at least one of block shape information and split shape information.

FIG. 13 illustrates a process of determining a depth of a coding unit according to a change in a shape and a size of the coding unit when a plurality of coding units are determined as the coding unit is recursively split, according to an embodiment.

According to an embodiment, the decoder 240 may determine a depth of a coding unit according to a predetermined standard. For example, the predetermined standard may be a length of a long side of the coding unit. When a length of a long side of a current coding unit is split 2n times shorter than a length of a long side of a coding unit before being split, the decoder 240 may determine that a depth of the current coding unit is increased n times a depth of the coding unit before being split, wherein n>0. Hereinafter, a coding unit having an increased depth is referred to as a coding unit of a lower depth.

Referring to FIG. 13, the decoder 240 may determine a second coding unit 1302 and a third coding unit 1304 of lower depths by splitting a first coding unit 1300 having a square shape, based on block shape information indicating a square shape (e.g., the block shape information may indicate '0:SQUARE') according to an embodiment. When a size of the first coding unit 1300 having a square shape is 2N×2N, the second coding unit 1302 determined by splitting a width and a height of the first coding unit 1300 by $1/2^1$ may have a size of N×N. In addition, the third coding unit 1304 determined by splitting a width and a height of the second coding unit 1302 by 1/2 may have a size of N/2×N/2. In this case, a width and a height of the third coding unit 1304 corresponds to $1/2^2$ of the first coding unit 1300. When a depth of first coding unit 1300 is D, a depth of the second coding unit 1302 having $1/2^1$ of the width and the height of the first coding unit 1300 may be D+1, and a depth of the third coding unit 1304 having $1/2^2$ of the width and the height of the first coding unit 1300 may be D+2.

According to an embodiment, the decoder 240 may determine a second coding unit 1312 or 1322 and a third coding unit 1314 or 1324 by splitting a first coding unit 1310 or 1320 having a non-square shape, based on block shape information indicating a non-square shape (e.g., the block shape information may indicate '1:NS_VER' indicating a non-square shape in which a height is greater than a width, or '2:NS_HOR' indicating a non-square shape in which a width is greater than a height) according to an embodiment.

The decoder 240 may determine a second coding unit (e.g., the second coding unit 1302, 1312, or 1322) by splitting at least one of a width and a height of the first coding unit 1310 having a size of N×2N. In other words, the decoder 240 may determine the second coding unit 1302 having a size of N×N or the second coding unit 1322 having a size of N×N/2 by splitting the first coding unit 1310 in a horizontal direction, or determine the second coding unit 1312 having a size of N/2×N by splitting the first coding unit 1310 in horizontal and vertical directions.

According to an embodiment, the decoder 240 may determine a second coding unit (e.g., the second coding unit 1302, 1312, or 1322) by splitting at least one of a width and a height of the first coding unit 1320 having a size of 2N×N. In other words, the decoder 240 may determine the second coding unit 1302 having a size of N×N or the second coding unit 1312 having a size of N/2×N by splitting the first coding unit 1320 in the vertical direction, or determine the second coding unit 1322 having a size of N×N/2 by splitting the first coding unit 1320 in the horizontal and vertical directions.

According to an embodiment, the decoder 240 may determine a third coding unit (e.g., the third coding unit 1304, 1314, or 1324) by splitting at least one of a width and a height of the second coding unit 1302 having a size of N×N. In other words, the decoder 240 may determine the third coding unit 1304 having a size of N/2×N/2, the third coding unit 1314 having a size of N/2^2×N/2, or the third coding unit 1324 having a size of N/2×N/2^2 by splitting the second coding unit 1302 in the vertical and horizontal directions.

According to an embodiment, the decoder 240 may determine a third coding unit (e.g., the third coding unit 1304, 1314, or 1324) by splitting at least one of a width and a height of the second coding unit 1312 having a size of N/2×N. In other words, the decoder 240 may determine the third coding unit 1304 having a size of N/2×N/2 or the third coding unit 1324 having a size of N/2×N/2^2 by splitting the second coding unit 1312 in the horizontal direction, or may determine the third coding unit 1314 having a size of N/2^2×N/2 by splitting the second coding unit 1312 in the vertical and horizontal directions.

According to an embodiment, the decoder 240 may determine a third coding unit (e.g., the third coding unit 1304, 1314, or 1324) by splitting at least one of a width and a height of the second coding unit 1314 having a size of N×N/2. In other words, the decoder 240 may determine the third coding unit 1304 having a size of N/2×N/2 or the third coding unit 1314 having a size of N/2^2×N/2 by splitting the second coding unit 1312 in the vertical horizontal direction, or may determine the third coding unit 1324 having a size of N/2×N/2^2 by splitting the second coding unit 1312 in the vertical and horizontal directions.

According to an embodiment, the decoder 240 may split a coding unit (e.g., the first, second, or third coding unit 1300, 1302, or 1304) having a square shape in the horizontal or vertical direction. For example, the first coding unit 1310 having a size of N×2N may be determined by splitting the first coding unit 1300 having a size of 2N×2N in the vertical direction, or the first coding unit 1320 having a size of 2N×N may be determined by splitting the first coding unit 1300 in the horizontal direction. According to an embodiment, when a depth is determined based on a length of a longest side of a coding unit, a depth of a coding unit determined when the first coding unit 1300, 1302, or 1304 having a size of 2N×2N is split in the horizontal or vertical direction may be the same as a depth of the first coding unit 1300, 1302, or 1304.

According to an embodiment, the width and the height of the third coding unit 1314 or 1324 may be 1/2^2 of those of the first coding unit 1310 or 1320. When the depth of the first coding unit 1310 or 1320 is D, the depth of the second coding unit 1312 or 1314 that is 1/2 of the width and the height of the first coding unit 1310 or 1320 may be D+1, and the depth of the third coding unit 1314 or 1324 that is 1/2^2 of the width and the height of the first coding unit 1310 or 1320 may be D+2.

FIG. 14 illustrates a PID for distinguishing depths and coding units that may be determined according to shapes and sizes of coding units, according to an embodiment.

According to an embodiment, the decoder 240 may determine second coding units having various shapes by splitting a first coding unit 1400 having a square shape. Referring to FIG. 14, the decoder 240 may determine second coding units 1402a, 1402b, 1404a, 1404b, 1406a, 1406b, 1406c, and 1406d by splitting the first coding unit 1400 in at least one of a vertical direction and a horizontal direction according to split shape information. In other words, the decoder 240 may determine the second coding units 1402a, 1402b, 1404a, 1404b, 1406a, 1406b, 1406c, and 1406d based on the split shape information of the first coding unit 1400.

According to an embodiment, a depth of the second coding units 1402a, 1402b, 1404a, 1404b, 1406a, 1406b, 1406c, and 1406d determined according to the split shape information of the first coding unit 1400 having a square shape may be determined based on a length of a long side. For example, since a length of one side of the first coding unit 1400 having a square shape is the same as a length of a long side of the second coding units 1402a, 1402b 1404a, and 1404b having a non-square shape, the depths of the first coding unit 1400 and the second coding units 1402a, 1402b, 1404a, and 1404b having a non-square shape may be the same, i.e., D. On the other hand, when the decoder 240 splits the first coding unit 1400 into the four second coding units 1406a through 1406d having a square shape, based on the split shape information, a length of one side of the second coding units 1406a through 1406d having a square shape is 1/2 of the length of one side of the first coding unit 1400, the depths of the second coding units 1406a through 1406d may be D+1, i.e., a depth lower than the depth D of the first coding unit 1400.

According to an embodiment, the decoder 240 may split the first coding unit 1410, in which a height is greater than a width, in the horizontal direction into the plurality of second coding units 1412a and 1412b or 1414a through 1414c, according to split shape information. According to an embodiment, the decoder 240 may split a first coding unit 1420, in which a width is greater than a height, in the vertical direction into a plurality of second coding units 1422a and 1422b or 1424a through 1424c, according to split shape information.

According to an embodiment, depths of the second coding units 1412a and 1412b, 1414a through 1414c, 1422a and 1422b, or 1424a through 1424c determined according to the split shape information of the first coding unit 1410 or 1420 having a non-square shape may be determined based on a length of a long side. For example, since a length of one side of the second coding units 1412a and 1412b having a square shape is 1/2 of a length of one side of the first coding unit 1410 having a non-square shape, in which the height is greater than the width, the depths of the second coding units 1402a, 1402b, 1404a, and 1404b having a square shape are D+1, i.e., depths lower than the depth D of the first coding unit 1410 having a non-square shape.

In addition, the decoder 240 may split the first coding unit 1410 having a non-square shape into an odd number of second coding units 1414a through 1414c based on split shape information. The odd number of second coding units 1414a through 1414c may include the second coding units 1414a and 1414c having a non-square shape, and the second coding unit 1414b having a square shape. In this case, since a length of a long side of each of the second coding units 1414a and 1414c having a non-square shape and a length of one side of the second coding unit 1414b having a square shape are 1/2 of a length of one side of the first coding unit 1410, depths of the second coding units 1414a through 1414b may be D+1, i.e., a depth lower than the depth D of the first coding unit 1410. The decoder 240 may determine depths of coding units related to the first coding unit 1420 having a non-square shape in which a width is greater than a height, in the same manner as the determining of depths of coding units related to the first coding unit 1410.

According to an embodiment, with respect to determining PIDs for distinguishing coding units, when an odd number of coding units do not have the same size, the decoder 240 may determine PIDs based on a size ratio of the coding units. Referring to FIG. 14, the second coding unit 1414b located at the center from among the odd number of second coding units 1414a through 1414c may have the same width as the second coding units 1414a and 1414c, but may have a height twice greater than those of the second coding units 1414*a* and 1414*c*. In this case, the second coding unit 1414*b* located at the center may include two of the second coding units 1414*a* and 1414*c*. Accordingly, when the PID of the second coding unit 1414*b* located at the center is 1 according to a scan order, the PID of the second coding unit 1414*c* in a next order may be 3, the PID having increased by 2. In other words, values of the PID may be discontinuous. According to an embodiment, the decoder 240 may determine whether an odd number of coding units have the same sizes based on discontinuity of PIDs for distinguishing the coding units.

(Determination of Tri-Split using PID)

According to an embodiment, an image decoding apparatus may determine whether a plurality of coding units determined when a current coding unit is split have predetermined split shapes based on values of PIDs. Referring to FIG. 14, the image decoding apparatus may determine the even number of second coding units 1412*a* and 1412*b* or the odd number of second coding units 1414*a* through 1414*c* by splitting the first coding unit 1410 having a rectangular shape in which the height is greater than the width. The image decoding apparatus may use a PID indicating each coding unit so as to distinguish a plurality of coding units. According to an embodiment, the PID may be obtained from a sample at a predetermined location (e.g., an upper left sample) of each coding unit.

According to an embodiment, the image decoding apparatus may determine a coding unit at a predetermined location from among coding units determined by using PIDs for distinguishing coding units. According to an embodiment, when split shape information of the first coding unit 1410 having a rectangular shape in which a height is greater than a width indicates that the first coding unit 1410 is split into three coding units, the image decoding apparatus may split the first coding unit 1410 into the three second coding units 1414*a* through 1414*c*. The image decoding apparatus may assign a PID to each of the three second coding units 1414*a* through 1414*c*. The image decoding apparatus may compare PIDs of an odd number of coding units so as to determine a center coding unit from among the coding units. The image decoding apparatus may determine, as a coding unit at a center location from among coding units determined when the first coding unit 1410 is split, the second coding unit 1414*b* having a PID corresponding to a center value from among PIDs, based on PIDs of the coding units. According to an embodiment, while determining PIDs for distinguishing coding units, when the coding units do not have the same size, the image decoding apparatus may determine PIDs based on a size ratio of the coding units. Referring to FIG. 14, the second coding unit 1414*b* generated when the first coding unit 1410 is split may have the same width as the second coding units 1414*a* and 1414*c*, but may have a height twice greater than those of the second coding units 1414*a* and 1414*c*. In this case, when the PID of the second coding unit 1414*b* located at the center is 1, the PID of the second coding unit 1414*c* in a next order may be 3, the PID having increased by 2. As such, when an increasing range of PIDs differs while uniformly increasing, the image decoding apparatus may determine that a current coding unit is split into a plurality of coding units including a coding unit having a different size from other coding units. According to an embodiment, when split shape information indicates splitting into an odd number of coding units, the image decoding apparatus may split a current coding unit into a plurality of coding units, in which a coding unit at a predetermined location (e.g., a center coding unit) has a size different from other coding units. In this case, the image decoding apparatus may determine the center coding unit having the different size by using PIDs of the coding units. However, a PID, and a size or location of a coding unit at a predetermined location described above are specified to describe an embodiment, and thus should not be limitedly interpreted, and various PIDs, and various locations and sizes of coding units may be used.

According to an embodiment, the decoder 240 may use a predetermined data unit from which recursive splitting of a coding unit starts.

FIG. 15 illustrates that a plurality of coding units are determined according to a plurality of predetermined data units included in a picture, according to an embodiment.

According to an embodiment, a predetermined data unit may be defined as a data unit from which a coding unit starts to be recursively split by using at least one of block shape information and split shape information. In other words, the predetermined data unit may correspond to a coding unit of an uppermost depth used while determining a plurality of coding units by splitting a current picture. Hereinafter, the predetermined data unit is referred to as a reference data unit for convenience of description.

According to an embodiment, the reference data unit may indicate a predetermined size and shape. According to an embodiment, the reference data unit may include M×N samples. Here, M and N may be the same, and may be an integer represented as a multiple of 2. In other words, the reference data unit may indicate a square shape or a non-square shape, and may later be split into an integer number of coding units.

According to an embodiment, the decoder 240 of the image decoding apparatus may split a current picture into a plurality of reference data units. According to an embodiment, the decoder 240 may split the plurality of reference data units obtained by splitting the current picture by using split shape information about each of the reference data units. A process of splitting the reference data units may correspond to a split process using a quad-tree structure.

According to an embodiment, the decoder 240 may predetermine a smallest size available for the reference data unit included in the current picture. Accordingly, the decoder 240 may determine the reference data unit having various sizes that are equal to or larger than the smallest size, and may determine at least one coding unit based on the determined reference data unit by using block shape information and split shape information.

Referring to FIG. 15, the image decoding apparatus may use the reference coding unit 1500 having a square shape, or may use a reference coding unit 1502 having a non-square shape. According to an embodiment, a shape and size of a reference coding unit may be determined according to various data units (e.g., a sequence, a picture, a slice, a slice segment, and a largest coding unit) that may include at least one reference coding unit.

According to an embodiment, a bitstream obtainer of the image decoding apparatus may obtain, from a bitstream, at least one of information about a shape of a reference coding unit and information about a size of the reference coding unit, according to the various data units. A process of determining at least one coding unit included in the reference coding unit 1500 having a square shape has been described above, and a process of determining at least one coding unit included in the reference coding unit 1500 having a non-square shape has been described above, and thus a detailed explanation thereof will not be given.

According to an embodiment, in order to determine a size and shape of a reference coding unit according to some data units pre-determined based on a predetermined condition, the decoder 240 may use a PID for distinguishing the size and the shape of the reference coding unit. In other words, the bitstream obtainer may obtain, from a bitstream, only the PID for distinguishing the size and the shape of the reference coding unit as a data unit satisfying a predetermined condition (e.g., a data unit having a size equal to or smaller than a slice) from among various data units (e.g., a sequence, a picture, a slice, a slice segment, and a largest coding unit), according to slices, slice segments, and largest coding units. The decoder 240 may determine the size and shape of the reference data unit according to data units that satisfy the predetermined condition by using the PID. When information about the shape of the reference coding unit and information about the size of the reference coding unit are obtained from the bitstream and used according to data units having relatively small sizes, usage efficiency of the bitstream may not be sufficient, and thus instead of directly obtaining the information about the shape of the reference coding unit and the information about the size of the reference coding unit, only the PID may be obtained and used. In this case, at least one of the size and the shape of the reference coding unit corresponding to the PID indicating the size and shape of the reference coding unit may be pre-determined. In other words, the decoder 240 may select at least one of the pre-determined size and shape of the reference coding unit according to the PID so as to determine at least one of the size and shape of the reference coding unit included in a data unit that is a criterion for obtaining the PID.

According to an embodiment, the decoder 240 may use at least one reference coding unit included in one largest coding unit. In other words, a largest coding unit splitting an image may include at least one reference coding unit, and a coding unit may be determined when each reference coding unit is recursively split. According to an embodiment, at least one of a width and height of the largest coding unit may be an integer times at least one of a width and height of the reference coding unit. According to an embodiment, a size of the reference coding unit may be equal to a size of the largest coding unit that is split n times according to a quad-tree structure. In other words, the decoder 240 may determine the reference coding unit by splitting the largest coding unit n times according to the quad-tree structure, and may split the reference coding unit based on at least one of block shape information and split shape information according to various embodiments.

FIG. 16 illustrates a processing block that becomes a criterion for determining a determining order of reference coding units included in the picture 1600, according to an embodiment.

According to an embodiment, the decoder 240 may determine at least one processing block splitting a picture. A processing block is a data unit including at least one reference coding unit splitting an image, and the at least one reference coding unit included in the processing block may be determined in a predetermined order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the decoder 240 may obtain information about a size of a processing block and may determine a size of at least one processing block included in an image. The decoder 240 may obtain, from a bitstream, the information about a size of a processing block and may determine the size of the at least one processing block included in the image. The size of the processing block may be a predetermined size of a data unit indicated by the information about a size of a processing block.

According to an embodiment, a bitstream obtainer of an image decoding apparatus may obtain, from the bitstream, the information about a size of a processing block according to predetermined data units. For example, the information about a size of a processing block may be obtained from the bitstream in data units such as images, sequences, pictures, slices, and slice segments. In other words, the bitstream obtainer may obtain, from the bitstream, the information about a size of a processing block according to such several data units, and the decoder 240 may determine the size of at least one processing block splitting the picture by using the obtained information about a size of a processing block, wherein the size of the processing block may be an integer times a size of a reference coding unit.

According to an embodiment, the decoder 240 may determine sizes of the processing blocks 1602 and 1612 included in the picture 1600. For example, the decoder 240 may determine a size of a processing block based on information about a size of a processing block obtained from a bitstream. Referring to FIG. 16, the decoder 240 may determine horizontal sizes of the processing blocks 1602 and 1612 to be four times a horizontal size of a reference coding unit, and vertical sizes thereof to be four times a vertical size of the reference coding unit, according to an embodiment. The decoder 240 may determine a determining order of at least one reference coding unit in at least one processing block.

According to an embodiment, the decoder 240 may determine each of the processing blocks 1602 and 1612 included in the picture 1600 based on a size of a processing block, and a reference coding unit determiner may determine a determining order of at least one reference coding unit included in each of the processing blocks 1602 and 1612. According to an embodiment, determining of a reference coding unit may include determining a size of the reference coding unit.

According to an embodiment, the decoder 240 may obtain, from a bitstream, information about a determining order of at least one reference coding unit included in at least one processing block, and may determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus may obtain, from a bitstream, information about a determining order of a reference coding unit according to predetermined data units. For example, the bitstream obtainer may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per predetermined data unit including an integer number of processing blocks.

According to an embodiment, the image decoding apparatus may determine at least one reference coding unit based on the determined order.

According to an embodiment, the bitstream obtainer may obtain, from the bitstream, information about a determining order of a reference coding unit, as information related to the processing blocks 1602 and 1612, and the decoder 240 may determine an order of determining at least one reference coding unit included in the processing blocks 1602 and 1612 and may determine at least one reference coding unit included in the picture 1600 according to a determining order of a coding unit. Referring to FIG. 16, the decoder 240 may determine determining orders 1604 and 1614 of at least one reference coding unit respectively related to the processing blocks 1602 and 1612. For example, when information about a determining order of a reference coding unit is obtained per processing block, determining orders of a reference coding unit related to the processing blocks 1602 and 1612 may be different from each other. When the determining order 1604 related to the processing block 1602 is a raster scan order, reference coding units included in the processing block 1602 may be determined according to the raster scan order. On the other hand, when the determining order 1614 related to the processing block 1612 is a reverse order of a raster scan order, reference coding units included in the processing block 1612 may be determined in the reverse order of the raster scan order.

The decoder 240 may decode determined at least one reference coding unit according to an embodiment. The decoder 240 may decode an image based on reference coding units determined through the above embodiments. Examples of a method of decoding a reference coding unit may include various methods of decoding an image.

According to an embodiment, the image decoding apparatus may obtain, from a bitstream, and use block shape information indicating a shape of a current coding unit or split shape information indicating a method of splitting the current coding unit. The block shape information or the split shape information may be included in a bitstream related to various data units. For example, the image decoding apparatus may use the block shape information or split shape information, which is included in a sequence parameter set, a picture parameter set, a video parameter set, a slice header, and a slice segment header. In addition, the image decoding apparatus may obtain, from a bitstream, and use syntax corresponding to the block shape information or the split shape information, according to largest coding units, reference coding units, and processing blocks.

According to an embodiment, the decoder 240 may differently determine a type of split shapes into which a coding unit may be split according to predetermined data units. The decoder 240 of the image decoding apparatus may differently determine a combination of shapes into which a coding unit may be split according to predetermined data units (e.g., sequences, pictures, and slices) according to an embodiment.

FIG. 17 illustrates coding units that may be determined for each picture when combinations of shapes into which a coding unit may be split are different, according to an embodiment.

Referring to FIG. 17, the decoder 240 may differently determine a combination of split shapes into which a coding unit may be split for each picture. For example, the decoder 240 may decode an image by using the picture 1700 that may be split into four coding units, the picture 1710 that may be split into two or four coding units, and the picture 1720 that may be split into two, three, or four coding units from among one or more pictures included in the image. The decoder 240 may use only split shape information indicating that the picture 1700 is split into four square coding units in order to split the picture 1700 into a plurality of coding units. The decoder 240 may use only split shape information indicating that the picture 1710 is split into two or four coding units in order to split the picture 1710. The decoder 240 may use only split shape information indicating that the picture 1720 is split into two, three, or four coding units in order to split the picture 1720. Since the combination of split shapes is merely an embodiment for describing an operation of the image decoding apparatus, the combination of the split shapes should not be interpreted as being limited to the embodiment and various combinations of split shapes may be used according to predetermined data units.

According to an embodiment, a bitstream obtainer of the image decoding apparatus may obtain a bitstream including an index indicating a combination of split shape information according to predetermined data units (e.g., sequences, pictures, and slices). For example, the bitstream obtainer may obtain an index indicating a combination of split shape information in a sequence parameter set, a picture parameter set, or a slice header. The decoder 240 of the image decoding apparatus may determine a combination of split shapes into which a coding unit may be split according to predetermined data units by using the obtained index, and thus a different combination of split shapes may be used according to predetermined data units.

FIG. 18 illustrates various shapes of a coding unit that may be determined based on split shape information that may be represented as a binary code, according to an embodiment.

According to an embodiment, an image decoding apparatus may split a coding unit into various shapes by using block shape information and split shape information obtained by a bitstream obtainer. Shapes into which a coding unit may be split may correspond to various shapes including shapes described with reference to the above embodiments.

Referring to FIG. 18, the decoder 240 may split a coding unit having a square shape in at least one of a horizontal direction and a vertical direction and may split a coding unit having a non-square shape in the horizontal direction or the vertical direction based on split shape information.

According to an embodiment, when the decoder 240 may split a coding unit having a square shape in the horizontal direction and the vertical direction into four square coding units, the number of split shapes that may be indicated by split shape information about the coding unit having a square shape may be 4. According to an embodiment, split shape information may be represented as a two-digit binary code, and a binary code may be assigned to each split shape. For example, when a coding unit is not split, the split shape information may be represented as (00)b; when a coding unit is split in the horizontal direction and the vertical direction, the split shape information may be represented as (01)b; when a coding unit is split in the horizontal direction, the split shape information may be represented as (10)b; and when a coding unit is split in the vertical direction, the split shape information may be represented as (11)b.

According to an embodiment, when the decoder 240 splits a coding unit having a non-square shape in the horizontal direction or the vertical direction, types of split shapes that may be indicated by split shape information may be determined according to the number of coding units into which the coding unit having a non-square shape is split. Referring to FIG. 18, the decoder 240 may split a coding unit having a non-square shape into up to three coding units according to an embodiment. The decoder 240 may split a coding unit into two coding units, and in this case, the split shape information may be represented as (10)b. The decoder 240 may split a coding unit into three coding units, and in this case, the split shape information may be represented as (11)b. The decoder 240 may determine that a coding unit is not split, and in this case, the split shape information may be represented as (0)b. That is, the decoder 240 may use VLC, instead of FLC, in order to use a binary code indicating the split shape information.

According to an embodiment, referring to FIG. 18, a binary code of split shape information indicating that a coding unit is not split may be represented as (0)b. If a binary code of split shape information indicating that a coding unit is not split is set to (00)b, although there is no split shape information set to (01)b, all two-bit binary codes of split shape information have to be used. However, as shown in FIG. 18, when three split shapes are used for a coding unit having a non-square shape, the decoder 240 may determine that a coding unit is not split although a one-bit binary code (0)b is used as split shape information, thereby efficiently using a bitstream. However, shapes into which a coding unit having a non-square shape is split which may be indicated by split shape information should not be interpreted as being limited to three shapes of FIG. 18, and should be interpreted as being various shapes including the above embodiments.

FIG. 19 illustrates other shapes of a coding unit that may be determined based on split shape information that may be represented as a binary code, according to an embodiment.

Referring to FIG. 19, the decoder 240 may split a coding unit having a square shape in a horizontal direction or a vertical direction and may split a coding unit having a non-square shape in the horizontal direction or the vertical direction based on split shape information. That is, split shape information may indicate that a coding unit having a square shape is split only in one direction. In this case, a binary code of split shape information indicating that a coding unit having a square shape is not split may be represented as (0)b. If a binary code of split shape information indicating that a coding unit is not split is set to (00)b, although there is no split shape information set to (01)b, all two-bit binary codes of split shape information have to be used. However, as shown in FIG. 19, when three split shapes are used for a coding unit having a square shape, the decoder 240 may determine that a coding unit is not split although a one-bit binary code (0)b is used as split shape information, thereby efficiently using a bitstream. Shape into which a coding unit having a square shape is split which may be indicated by split shape information should not be interpreted as being limited to three shapes of FIG. 19, and should be interpreted as being various shapes including the above embodiments.

According to an embodiment, block shape information or split shape information may be represented by using a binary code, and such information may be directly generated as a bitsream. Also, block shape information or split shape information that may be represented as a binary code may be used as a binary code input during context adaptive binary arithmetic coding (CABAC), without being directly generated as a bitstream.

According to an embodiment, a process by which an image decoding apparatus obtains syntax about block shape information or split shape information through CABAC will be described. A bitstream obtainer may obtain a bitstream including a binary code for the syntax. The decoder 240 may detect a syntax element indicating the block shape information or the split shape information by de-binarizing a bin string included in the obtained bitstream. According to an embodiment, the decoder 240 may obtain a set of binary bin strings corresponding to the syntax element to be decoded and may decode each bin by using probability information, and the decoder 240 may repeatedly perform this process until a bin string including such decoded bins is the same as one of pre-obtained bin strings. The decoder 240 may determine the syntax element by de-binarizing the bin string.

According to an embodiment, the decoder 240 may determine syntax about a bin string by performing a decoding process of adaptive binary arithmetic coding, and may update a probability model for bins obtained by the bitstream obtainer. Referring to FIG. 18, the bitstream obtainer of the image decoding apparatus may obtain a bitstream indicating a binary code indicating split shape information according to an embodiment. The decoder 240 may determine syntax about the split shape information by using the obtained binary code having a size of 1 bit or 2 bits. The decoder 240 may update a probability of each bit from among the 2 bits of the binary code in order to determine the syntax about the split shape information. That is, the decoder 240 may update a probability that may have a value of 0 or 1 when decoding a next bin according to whether a value of a first bin in the 2 bits of the binary code is 0 or 1.

According to an embodiment, while determining the syntax, the decoder 240 may update a probability of the bins used in a process of decoding the bins of the bin string for the syntax, and the decoder 240 may determine that a specific bit in the bin string has the same probability without updating the probability.

Referring to FIG. 18, while determining syntax by using a bin string indicating split shape information about a coding unit having a non-square shape, the decoder 240 may determine the syntax about the split shape information by using one bin having a value of 0 when the coding unit having a non-square shape is not split. That is, when block shape information indicates that a current coding unit has a non-square shape, a first bin of a bin string for the split shape information may be 0 when the coding unit having a non-square shape is not split and may be 1 when the coding unit having a non-square shape is split into two or three coding units. Accordingly, a probability that a first bin of a bin string of split shape information about a coding unit having a non-square shape is 0 may be 1/3 and a probability that the first bin of the bin string of the split shape information about the coding unit having a non-square shape is 1 may be 2/3. As described above, split shape information indicating that a coding unit having a non-square shape is not split may represent only a bin string of 1 bit having a value of 0, the decoder 240 may determine syntax about the split shape information by determining whether a second bin is 0 or 1 only when the first bin of the split shape information is 1. According to an embodiment, when the first bin for the split shape information is 1, the decoder 240 may decode a bin by determining that probabilities that the second bin is 0 or 1 are the same.

According to an embodiment, an image decoding apparatus may use various probabilities for each bin while determining a bin of a bin string for split shape information. According to an embodiment, the decoder 240 may differently determine probabilities of bins for split shape information based on a direction of a non-square block. According to an embodiment, the decoder 240 may differently determine probabilities of bins for split shape information based on an area or a length of a long side of a current coding unit. According to an embodiment, the decoder 240 may differently determine probabilities of bins for split shape information based on at least one from among a shape and a length of a long side of a current coding unit.

According to an embodiment, the decoder 240 may determine that probabilities of bins for split shape information are the same with respect to coding units having a predetermined size or more. For example, the decoder 240 may determine that probabilities of bins for split shape information are the same with respect to coding units having a size equal to or greater than 64 samples based on a length of a long side of each coding unit.

According to an embodiment, the decoder 240 may determine an initial probability of bins constituting a bin string of split shape information based on a slice type (e.g., an I-slice, a P-slice, or a B-slice).

Figure 20:
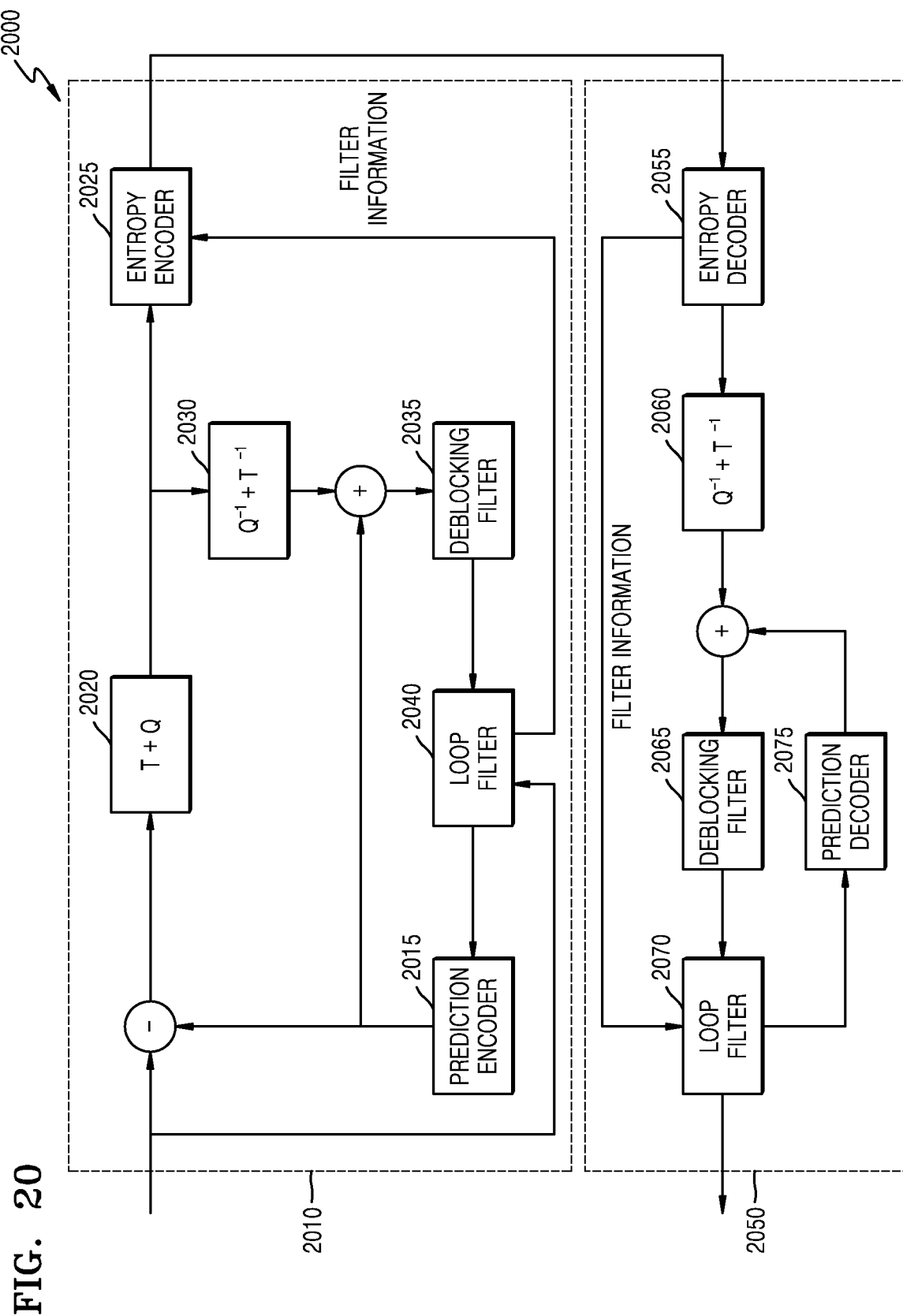
FIG. 20 is a block diagram of an image encoding and decoding system for performing loop filtering.

FIG. 20 is a block diagram of an image encoding and decoding system 2000 for performing loop filtering.

An encoding end 2010 of the image encoding and decoding system 2000 transmits an encoded bitstream of an image, and a decoding end 2050 receives and decodes the bitstream and outputs a reconstruction image. The encoding end 2010 may have a configuration similar to that of an image encoding apparatus 200 which will be described below, and the decoding end 2050 may have a configuration similar to that of an image decoding apparatus.

In the encoding end 2010, a prediction encoder 2015 outputs a reference image through inter prediction and intra prediction, and a transformer and quantizer 2020 quantizes residual data between the reference image and a current input image into a quantized transform coefficient and outputs the quantized transform coefficient. An entropy encoder 2025 encodes and transforms the quantized transform coefficient into a bitstream and outputs the bitstream. The quantized transform coefficient is reconstructed as data in a spatial domain by a de-quantizer and inverse converter 2030, and the reconstructed data in the spatial domain is output as a reconstruction image through a deblocking filter 2035 and a loop filter 2040. The reconstruction image may be used as a reference image of a next input image through the prediction encoder 2015.

Encoded image data from among the bitstream received by the decoding end 2050 is reconstructed as residual data in a spatial domain through an entropy decoder 2055 and a de-quantizer and inverse converter 2060. Image data in a spatial domain is formed as the residual data and a reference image output from a prediction decoder 2075 are combined, and a deblocking filter 2065 and a loop filter 2070 may filter the image data in the spatial domain and may output a reconstruction image for a current original image. The reconstruction image may be used as a reference image for a next original image by the prediction decoder 2075.

The loop filter 2040 of the encoding end 2010 performs loop filtering by using filter information input according to a user input or a system setting. The filter information used by the loop filter 2040 is output from the entropy encoder 2010, and is transmitted along with the encoded image data to the decoding end 2050. The loop filter 2070 of the decoding end 2050 may perform loop filtering based on the filter information input from the decoding end 2050.

Figure 21:
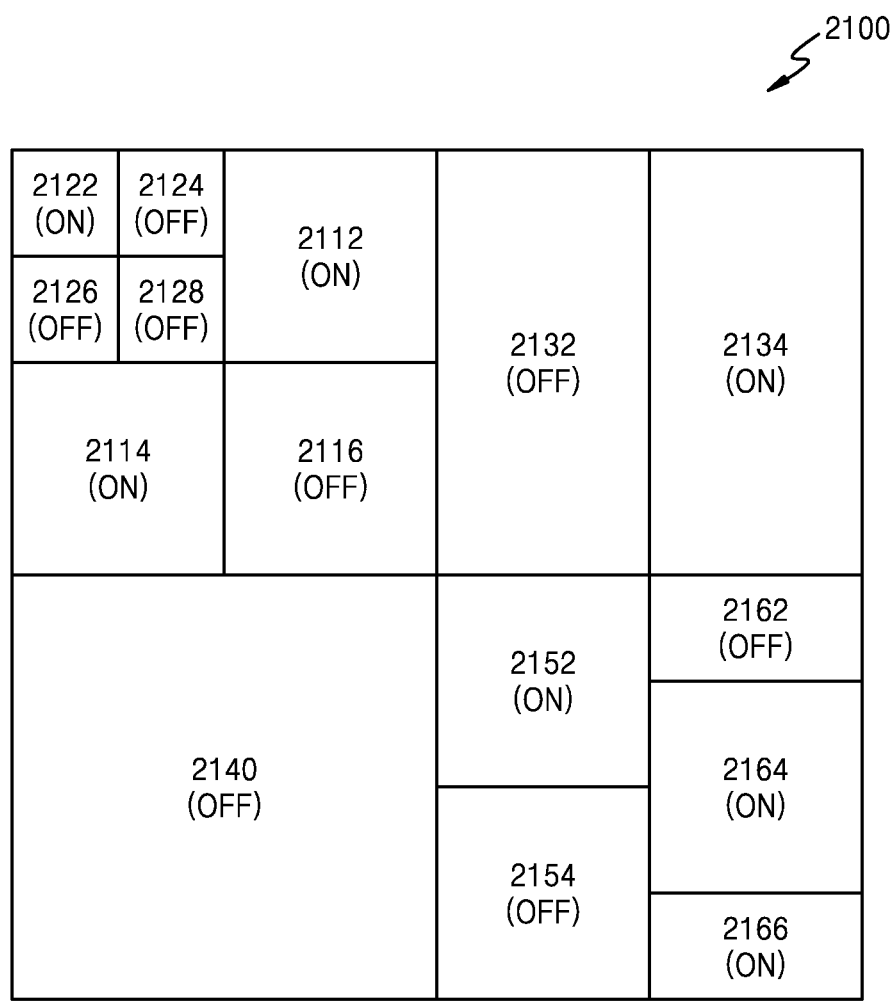
FIG. 21 illustrates an example of filtering units included in a largest coding unit and filtering performance information of a filtering unit, according to an embodiment.

FIG. 21 illustrates an example of filtering units included in a largest coding unit and filtering performance information of a filtering unit, according to an embodiment.

When filtering units of the loop filter 2040 of the encoding end 2010 and the loop filter 2070 of the decoding end 2050 include data units similar to coding units according to an embodiment described with reference to FIGS. 3 through 5, filter information may include block shape information and split shape information of a data unit for indicating a filtering unit, and loop filtering performance information indicating whether loop filtering is performed on the filtering unit.

Filtering units included in a largest coding unit 2100 according to an embodiment may have the same block shape and split shape as coding units included in the largest coding unit 2100. Also, the filtering units included in the largest coding unit 2100 according to an embodiment may be split based on sizes of the coding units included in the maximum coding units 2100. Referring to FIG. 21, for example, the filtering units may include a filtering unit 2140 having a square shape and a depth of D, filtering units 2132 and 2134 having a non-square shape and a depth of D, filtering units 2112, 2114, 2116, 2152, 2154, and 2164 having a square shape and a depth of D+1, filtering units 2162 and 2166 having a non-square shape and a depth of D+1, and filtering units 2122, 2124, 2126, and 2128 having a square shape and a depth of D+2.

The block shape information, the split shape information (depth), and the loop filtering performance information of the filtering units included in the largest coding unit 2100 may be encoded as shown in Table 1.

TABLE 1

| Block ratio information | First block shape | Whether to change and shape after change |
|---|---|---|
| 0000 | 2N × 2N | 2N × 2N |
| 0001 | N × N | N × N |
| 0010 | 2N × N | 2N × nU |
| 0011 |  | 2N × N |
| 0100 | N × 2N | nL × 2N |
| 0101 |  | N × 2N |
| 0110 | nL × 2N | N × 2N |
| 0111 |  | nL × 2N |
| 1000 | nR × 2N | N × 2N |
| 1001 |  | nR × 2N |
| 1010 | eN × nU | 2N × N |
| 1011 |  | 2N × nU |
| 1100 | 2N × nD | 2N × N |
| 1101 |  | 2N × nD |

A process of determining a plurality of coding units by recursively splitting a coding unit according to block shape information and block split information according to an embodiment is the same as that described with reference to FIG. 13. Loop filtering performance information of filtering units according to an embodiment indicates that loop filtering is performed on the filtering units when a flag value is 1, and indicates that loop filtering is not performed on the filtering units when a flag value is 0. Referring to Table 1, information of data units for determining filtering units to be filtered by the loop filters 2040 and 2070 may all be encoded and transmitted as filter information.

Since coding units configured according to an embodiment are coding units configured to minimize an error with an original image, it is expected to have a high spatial correlation in the coding units. Accordingly, since a filtering unit is determined based on a coding unit according to an embodiment, an operation of determining a filtering unit, separate from determining of a coding unit, may be omitted. Also, accordingly, since a filtering unit is determined based on a coding unit according to an embodiment and thus information for determining a split shape of the filtering unit may be omitted, a transfer bit rate of filter information may be saved.

Although it is described in the above embodiments that a filtering unit is determined based on a coding unit according to an embodiment, a filtering unit may be split based on a coding unit until an arbitrary depth, and thus a shape of the filtering unit may be determined up to only the arbitrary depth.

The determining of a filtering unit described in the above embodiments may be applied not only to loop filtering but also to various embodiments such as deblocking filtering and adaptive loop filtering.

According to an embodiment, an image decoding apparatus may split a current coding unit by using at least one of block shape information and split shape information, and the block shape information may be pre-determined to indicate using only a square shape and the split shape information may be pre-determined to indicate that the current coding unit is not split or split into four square coding units. That is, coding units of the current coding unit may always have a square shape according to the block shape information and the current coding unit may not be split or split into four square coding units based on the split shape information. The image decoding apparatus may obtain, by using a bitstream obtainer, a bitstream generated by using a predetermined encoding method that is pre-determined to only use such block shapes and split shapes, and the decoder 240 may use only the pre-determined block shapes and split shapes. In this case, since the image decoding apparatus may solve a compatibility problem with the predetermined encoding method by using a predetermined decoding method similar to the predetermined encoding method. According to an embodiment, when the image decoding apparatus uses the predetermined decoding method using only the pre-determined block shapes and split shapes from among various shapes that may be indicated by the block shape information and the split shape information, the block shape information only indicates a square shape, and thus the image decoding apparatus may not perform a process of obtaining the block shape information from the bitstream. Syntax indicating whether to use the predetermined decoding method may be used, and such syntax may be obtained from the bitstream according to data units having various shapes that may include a plurality of coding units such as sequences, pictures, slice units, and largest coding units. That is, the bitstream obtainer may determine whether syntax indicating the block shape information is to be obtained from the bitstream based on syntax indicating whether the predetermined decoding method is used.

FIG. 23 illustrates an index according to a Z-scan order of a coding unit according to an embodiment.

An image decoding apparatus according to an embodiment may scan lower data units included in an upper data unit according to a Z-scan order. Also, the image decoding apparatus according to an embodiment may sequentially access data according to a Z-scan index in a coding unit included in a processing block or a largest coding unit.

The image decoding apparatus according to an embodiment may split a reference coding unit into at least one coding unit as described above. In this case, coding units having a square shape and coding units having a non-square shape may co-exist in the reference coding unit. The image decoding apparatus according to an embodiment may access data according to a Z-scan index included in each coding unit in the reference coding unit. In this case, a method of applying a Z-scan index may vary according to whether a coding unit having a non-square shape exists in the reference coding unit.

According to an embodiment, when a coding unit having a non-square shape does not exist in the reference coding unit, coding units of a lower depth in the reference coding unit may have continuous Z-scan indices. For example, according to an embodiment, a coding unit of an upper depth may include four coding units of a lower depth. Boundaries of the four coding units of the lower depth may be continuous, and the coding units of the lower depth may be scanned in a Z-scan order according to indices indicating the Z-scan order. The indices indicating the Z-scan order according to an embodiment may be set to numbers that increase according to the Z-scan order for the coding units. In this case, deeper coding units of the same depth may be scanned according to the Z-scan order.

According to an embodiment, when at least one coding unit having a non-square shape exists in the reference coding unit, the image decoding unit may split each of the coding units in the reference coding unit into sub-blocks, and may scan the split sub-blocks according to the Z-scan order. For example, when a coding unit having a non-square shape in a vertical shape or a horizontal shape exists in the reference coding unit, Z-scan may be performed by using split sub-blocks. Also, for example, when the reference coding unit is split into an odd number of coding units, Z-scan may be performed by using sub-blocks. A sub-block is a coding unit that is no longer split or a coding unit obtained by splitting an arbitrary coding unit, and may have a square shape. For example, four sub-blocks having a square shape may be split from a coding unit having a square shape. Also, for example, two sub-blocks having a square shape may be split form a coding unit having a non-square shape.

Referring to FIG. 23, for example, the image decoding apparatus according to an embodiment may scan coding units 2302, 2304, 2306, 2308, and 2310 of a lower depth in a coding unit 2300 according to a Z-scan order. The coding unit 2300 and the coding units 2302, 2304, 2306, 2308, and 2310 are respectively an upper coding unit and lower coding units. The coding unit 2300 includes the coding units 2306 and 2310 having a non-square shape in a horizontal direction. The coding units 2306 and 2310 having a non-square shape have discontinuous boundaries with the coding units 2302 and 2304 having a square shape. Also, the coding unit 2308 has a square shape, and is a coding unit at the center when a coding unit having a non-square shape is split into an odd number of coding units. Like the coding units 2306 and 2310 having a non-square shape, the coding unit 2308 has discontinuous boundaries with the coding units 2302 and 2304 that are adjacent to each other and have a square shape. When the coding unit 2300 includes the coding units 2306 and 2310 having a non-square shape or the coding unit 2308 located at the center when a coding unit having a non-square shape is split into an odd number of coding units, since adjacent boundaries between coding units are discontinuous, continuous Z-scan indices may not be set. Accordingly, the image decoding apparatus may continuously set Z-scan indices by splitting coding units into sub-blocks. Also, the image decoding apparatus may perform continuous Z-scan on the coding units 2306 and 2310 having a non-square shape or the coding unit 2308 located at the center of an odd number of coding units having a non-square shape.

A coding unit 2320 of FIG. 23 is obtained by splitting the coding units 2302, 2304, 2306, 2308, and 2310 in the coding unit 2300 into sub-blocks. Since a Z-scan index may be set for each of the sub-blocks, and adjacent boundaries between the sub-blocks are continuous, the sub-blocks may be scanned according to a Z-scan order. For example, in a decoding apparatus according to an embodiment, the coding unit 2308 may be split into sub-blocks 2322, 2324, 2326 and 2328. In this case, the sub-blocks 2322 and 2324 may be scanned after data processing is performed on a sub-block 2330, and the sub-blocks 2326 and 2328 may be scanned after data processing is performed on a sub-block 2332. Also, the sub-blocks may be scanned according to the Z-scan order.

In the above embodiments, data units are scanned according to a Z-scan order for data storage, data loading, and data accessing.

Also, in the above embodiments, although data units may be scanned according to a Z-scan order, a scan order of data units may vary, for example, a raster scan order, an N-scan order, an up-right diagonal scan order, a horizontal scan order, and a vertical scan order, and should not be limited to the Z-scan order.

Also, in the above embodiments, although coding units in a reference coding unit are scanned, the present disclosure is not limited thereto and a target to be scanned may be an arbitrary block in a processing block or a largest coding unit.

Also, in the above embodiments, although a block is split into sub-blocks and scanning is performed according to a Z-scan order only when at least one block having a non-square shape exists, a block may be split into sub-blocks and scanning may be performed according to a Z-scan order even when a block having a non-square shape does not exist for a simplified embodiment.

The image decoding apparatus according to an embodiment may generate prediction data by performing inter prediction or intra prediction on a coding unit, may generate residual data by performing inverse transformation on a transform unit included in a current coding unit, and may reconstruct the current coding unit by using the generated prediction data and the residual data.

A prediction mode of a coding unit according to an embodiment may be at least one of an intra mode, an inter mode, and a skip mode. According to an embodiment, a prediction mode may be independently selected according to coding units.

When a coding unit having a 2N×2N shape is split into two coding units having a 2N×N shape or a N×2N shape according to an embodiment, inter mode prediction and intra mode prediction may be separately performed on each coding unit. Also, a skip mode may be applied to the coding units having the 2N×N or N×2N shape according to an embodiment.

The image decoding apparatus according to an embodiment may allow performing bi-prediction in a skip mode of a coding unit having a 8×4 or 4×8 shape. Since only skip mode information about a coding unit is received in a skip mode, the use of residual data for the coding unit is omitted. Accordingly, in this case, an overhead of de-quantization and inverse transformation may be reduced. Instead, the image decoding apparatus according to an embodiment may allow performing bi-prediction on a coding unit to which a skip mode is applied, so as to improve decoding efficiency. Also, the image decoding apparatus according to an embodiment may efficiently use a memory bandwidth by setting an interpolation tap number to a relatively small value during motion compensation while allowing performing bi-prediction on a coding unit having a 8×4 or 4×8 shape. For example, an interpolation filter having a tap number less than 8 (e.g., a 2-tap interpolation filter), instead of an 8-tap interpolation filter, may be used.

Also, the image decoding apparatus according to an embodiment may signal intra or inter prediction information about each region included in a current coding unit by splitting the region into a pre-set shape (e.g., diagonal-based split).

The image decoding apparatus according to an embodiment may obtain a prediction sample of a current coding unit using an intra mode by using adjacent samples of the current coding unit. In this case, intra prediction is performed by using adjacent samples that are pre-reconstructed, and the samples are referred to as reference samples.

Figure 24:
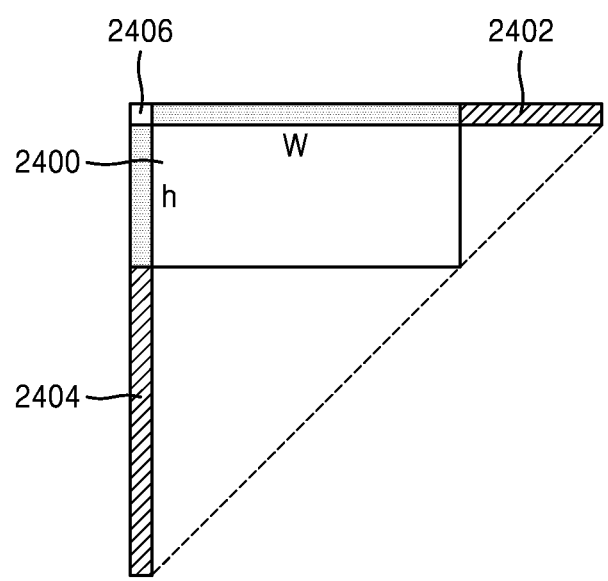
FIG. 24 illustrates a reference sample for intra prediction of a coding unit, according to an embodiment.

FIG. 24 is a diagram of a reference sample for intra prediction of a coding unit, according to an embodiment. Referring to FIG. 24, for the coding unit 2400 where a block shape is a non-square shape, a length in a horizontal direction is w, and a length in a vertical length is h, w+h upper reference samples 2402, w+h left reference samples 2404, and one upper left reference sample 2406 are required, that is, the total number of 2(w+h)+1 reference samples are required. In order to prepare a reference sample, padding may be performed on a part where the reference sample does not exist, and a reference sample filtering process may be performed for each prediction mode to reduce a quantization error included in a reconstructed reference sample.

Although the number of reference samples when a block shape of a current coding unit is a non-square shape has been described in the above embodiments, the number of reference samples is equally applied even when a current coding unit is a rectangular shape.

While this disclosure has been particularly shown and described with reference to embodiments thereof, it will be understood by one of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer-readable recording medium. Examples of the computer-readable recording medium include magnetic storage media (e.g., read-only memories (ROMs), floppy disks, or hard disks), optical recording media (e.g., compact disk (CD)-ROMs or digital versatile disks (DVDs)), etc.

What is claimed is:

1. A video decoding method comprising:
   obtaining transform shape information about whether a current coding unit is split in a vertical direction or a horizontal direction or is not split, from a bitstream;
   determining a horizontal length and a vertical length of a transform block with respect to the current coding unit based on the transform shape information;
   obtaining an encoded data from the bitstream;
   obtaining transform kernel information indicating whether a non-separable transform is used or which transform kernel is used from among transform kernel candidates;
   when the transform kernel information indicates that the non-separable transform is used, determining a transform kernel among the transform kernel candidates based on the horizontal length and the vertical length of the transform block, an intra prediction mode used in intra prediction, and the transform kernel information;

performing inverse transformation on the encoded data by using the determined transform kernel in order to obtain a residual sample; and reconstructing the current coding unit based on the residual sample and a prediction sample obtained by performing intra prediction.

2. A video encoding method comprising:

generating transform shape information about whether a current coding unit is split in a vertical direction or a horizontal direction or is not split;

determining a horizontal length and a vertical length of a residual block with respect to the current coding unit based on the transform shape information;

generating transform kernel information indicating whether a non-separable transform is used or which transform kernel is used from among transform kernel candidates;

when the transform kernel information indicates that the non-separable transform is used, determining a transform kernel among the transform kernel candidates based on the horizontal length and the vertical length of the residual block, an intra prediction mode used in intra prediction, and the transform kernel information; and performing transformation on a residual sample by applying the determined transform kernel to obtain an encoded data.

3. A non-transitory computer-readable storage medium having stored thereon computer executable instructions that when executed by at least one processor perform operations for video encoding to generate a bitstream, the bitstream comprising:

transform shape information about whether a current coding unit is split in a vertical direction or a horizontal direction or is not split; and transform kernel information indicating whether a non-separable transform is used or which transform kernel is used from among transform kernel candidates, wherein the operations for video encoding comprises:

generating the transform shape information about whether the current coding unit is split in the vertical direction or the horizontal direction or is not split;

determining a horizontal length and a vertical length of a residual block with respect to the current coding unit based on the transform shape information;

generating the transform kernel information indicating whether the non-separable transform is used or which transform kernel is used from among transform kernel candidates;

when the transform kernel information indicates that the non-separable transform is used, determining a transform kernel among the transform kernel candidates based on the horizontal length and the vertical length of the residual block, an intra prediction mode used in intra prediction, and the transform kernel information; and performing transformation on a residual sample by applying the determined transform kernel to obtain an encoded data.

* * * * *